(12) United States Patent
Pawlowski

(10) Patent No.: US 12,067,767 B2
(45) Date of Patent: Aug. 20, 2024

(54) BUSES FOR PATTERN-RECOGNITION PROCESSORS

(71) Applicant: Micron Technology, Inc., Boise, ID (US)

(72) Inventor: J. Thomas Pawlowski, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 99 days.

(21) Appl. No.: 17/332,369

(22) Filed: May 27, 2021

(65) Prior Publication Data

US 2021/0287027 A1    Sep. 16, 2021

Related U.S. Application Data

(63) Continuation of application No. 16/249,682, filed on Jan. 16, 2019, now Pat. No. 11,023,758, which is a continuation of application No. 12/350,136, filed on Jan. 7, 2009, now abandoned.

(51) Int. Cl.
    *G06V 10/94*    (2022.01)
(52) U.S. Cl.
    CPC ...... *G06V 10/955* (2022.01); *G06F 2207/025* (2013.01); *G06F 2218/00* (2023.01)
(58) Field of Classification Search
    CPC .............. G06V 10/955; G06F 2218/00; G06F 2207/025
    See application file for complete search history.

(56) References Cited

U.S. PATENT DOCUMENTS

| | | | |
|---|---|---|---|
| 3,849,762 A | 11/1974 | Fujimoto et al. |
| 3,921,136 A | 11/1975 | Bar-Lev |
| 4,011,547 A | 3/1977 | Kimmel |
| 4,014,000 A | 3/1977 | Uno et al. |
| 4,123,695 A | 10/1978 | Hale et al. |
| 4,153,897 A | 5/1979 | Yasuda et al. |
| 4,204,193 A | 5/1980 | Schroeder |
| 4,414,685 A | 11/1983 | Sternberg |
| 4,495,571 A | 1/1985 | Staplin, Jr. et al. |
| 4,748,674 A | 5/1988 | Freeman |

(Continued)

FOREIGN PATENT DOCUMENTS

| | | |
|---|---|---|
| EP | 0476159 A1 | 3/1992 |
| EP | 0943995 A2 | 9/1999 |

(Continued)

OTHER PUBLICATIONS

N. El-Nadi, G. M. Aly, Z. T. Fayed and H. M. Faheem, "AMAP for typecasting," in IEEE Potentials, vol. 20, No. 2, pp. 28-30, Apr.-May 2001, doi: 10.1109/45.954654. (Year: 2001).*

(Continued)

*Primary Examiner* — Eric T Oberly
(74) *Attorney, Agent, or Firm* — Fletcher Yoder, P.C.

(57) ABSTRACT

Disclosed are methods and systems, among which is a system that includes a pattern-recognition processor, a central processing unit (CPU) coupled to the pattern-recognition processor via a pattern-recognition bus, and memory coupled to the CPU via a memory bus. In some embodiments, the pattern-recognition bus and the memory bus form about the same number of connections to the pattern-recognition processor and the memory, respectively.

20 Claims, 12 Drawing Sheets

(56) References Cited

U.S. PATENT DOCUMENTS

| | | | |
|---|---|---|---|
| 5,014,327 A | 5/1991 | Potter et al. | |
| 5,028,821 A | 7/1991 | Kaplinsky | |
| 5,216,748 A | 6/1993 | Quenot et al. | |
| 5,257,361 A | 10/1993 | Doi et al. | |
| 5,287,523 A | 2/1994 | Allison et al. | |
| 5,291,482 A | 3/1994 | McHarg et al. | |
| 5,300,830 A | 4/1994 | Hawes | |
| 5,331,227 A | 7/1994 | Hawes | |
| 5,357,512 A | 10/1994 | Khaira et al. | |
| 5,371,878 A | 12/1994 | Coker | |
| 5,377,129 A | 12/1994 | Molvig et al. | |
| 5,459,798 A * | 10/1995 | Bailey | G06K 9/6297 |
| | | | 382/218 |
| 5,524,250 A | 6/1996 | Chesson et al. | |
| 5,615,237 A | 3/1997 | Chang et al. | |
| 5,659,551 A | 8/1997 | Huott et al. | |
| 5,723,984 A | 3/1998 | Sharpe-Geisier | |
| 5,754,878 A * | 5/1998 | Asghar | G06F 9/3885 |
| | | | 712/35 |
| 5,790,531 A | 8/1998 | Ellebracht et al. | |
| 5,793,994 A * | 8/1998 | Mitchell | G06F 13/4234 |
| | | | 711/212 |
| 5,881,312 A | 3/1999 | Dulong | |
| 5,896,548 A | 4/1999 | Ofek | |
| 5,956,741 A | 9/1999 | Jones | |
| 5,986,969 A | 11/1999 | Holder, Jr. | |
| 6,011,407 A | 1/2000 | New | |
| 6,016,361 A | 1/2000 | Hongu et al. | |
| 6,032,247 A * | 2/2000 | Asghar | G06F 9/382 |
| | | | 712/E9.067 |
| 6,034,963 A | 3/2000 | Minami et al. | |
| 6,041,405 A | 3/2000 | Green | |
| 6,052,766 A | 4/2000 | Betker et al. | |
| 6,058,469 A | 5/2000 | Baxter | |
| 6,151,644 A | 11/2000 | Wu | |
| 6,240,003 B1 | 5/2001 | McElroy | |
| 6,279,128 B1 * | 8/2001 | Arnold | G06F 21/567 |
| | | | 714/720 |
| 6,317,427 B1 | 11/2001 | Augusta et al. | |
| 6,362,868 B1 | 3/2002 | Silverbrook | |
| 6,400,996 B1 | 6/2002 | Hoffberg et al. | |
| 6,606,699 B2 | 8/2003 | Pechanek et al. | |
| 6,614,703 B2 | 9/2003 | Pitts et al. | |
| 6,625,740 B1 | 9/2003 | Datar et al. | |
| 6,633,443 B1 | 10/2003 | Watanabe et al. | |
| 6,636,483 B1 | 10/2003 | Pannell | |
| 6,640,262 B1 | 10/2003 | Uppunda et al. | |
| 6,697,979 B1 | 2/2004 | Vorbach et al. | |
| 6,700,404 B1 | 3/2004 | Feng et al. | |
| 6,880,087 B1 | 4/2005 | Carter | |
| 6,906,938 B2 | 6/2005 | Kaginele | |
| 6,944,710 B2 | 9/2005 | Regev et al. | |
| 6,977,897 B1 | 12/2005 | Nelson et al. | |
| 7,010,639 B2 | 3/2006 | Larson et al. | |
| 7,089,352 B2 | 8/2006 | Regev et al. | |
| 7,013,394 B1 | 9/2006 | Lingafelt et al. | |
| 7,146,643 B2 | 12/2006 | Dapp et al. | |
| 7,176,717 B2 | 2/2007 | Sunkavalli et al. | |
| 7,260,558 B1 | 8/2007 | Cheng et al. | |
| 7,276,934 B1 | 10/2007 | Young | |
| 7,305,047 B1 | 12/2007 | Turner | |
| 7,358,761 B1 | 4/2008 | Sunkavalli et al. | |
| 7,366,352 B2 | 4/2008 | Kravec et al. | |
| 7,392,229 B2 | 6/2008 | Harris et al. | |
| 7,428,722 B2 | 9/2008 | Sunkavalli et al. | |
| 7,444,434 B2 | 10/2008 | Kravec et al. | |
| 7,487,131 B2 | 2/2009 | Harris et al. | |
| 7,487,542 B2 | 2/2009 | Boulanger et al. | |
| 7,499,464 B2 | 3/2009 | Ayrapetian et al. | |
| 7,725,510 B2 | 5/2010 | Alicherry et al. | |
| 7,774,286 B1 | 8/2010 | Harris | |
| 7,804,719 B1 | 9/2010 | Chirania et al. | |
| 7,890,923 B2 | 2/2011 | Elaasar | |
| 7,899,052 B1 | 3/2011 | Hao et al. | |
| 7,917,684 B2 | 3/2011 | Noyes et al. | |
| 7,970,964 B2 | 6/2011 | Noyes | |
| 8,015,530 B1 | 9/2011 | Sinclair et al. | |
| 8,020,131 B1 | 9/2011 | Van Mau et al. | |
| 8,065,249 B1 | 11/2011 | Harris et al. | |
| 8,140,780 B2 | 3/2012 | Noyes | |
| 8,146,040 B1 | 3/2012 | Janneck et al. | |
| 8,159,900 B2 | 4/2012 | Moore et al. | |
| 8,209,521 B2 | 6/2012 | Noyes et al. | |
| 8,239,660 B2 | 8/2012 | Cervini | |
| 8,281,395 B2 | 10/2012 | Pawlowski | |
| 8,294,490 B1 | 10/2012 | Kaviani | |
| 8,402,188 B2 | 3/2013 | Noyes et al. | |
| 8,536,896 B1 | 9/2013 | Trimberger | |
| 8,593,175 B2 | 11/2013 | Noyes et al. | |
| 8,648,621 B2 | 2/2014 | Noyes et al. | |
| 8,680,888 B2 | 3/2014 | Brown et al. | |
| 8,725,961 B2 | 5/2014 | Noyes | |
| 8,782,624 B2 | 7/2014 | Brown et al. | |
| 8,938,590 B2 | 1/2015 | Noyes et al. | |
| 9,058,465 B2 | 6/2015 | Noyes et al. | |
| 9,063,532 B2 | 6/2015 | Brown | |
| 9,075,428 B2 | 7/2015 | Brown | |
| 9,118,327 B2 | 8/2015 | Noyes et al. | |
| 9,235,798 B2 | 1/2016 | Brown et al. | |
| 2002/0186044 A1 | 12/2002 | Agrawal et al. | |
| 2003/0014579 A1 | 6/2003 | Heigl et al. | |
| 2003/0107996 A1 | 6/2003 | Black et al. | |
| 2003/0142698 A1 | 7/2003 | Parhl | |
| 2003/0163615 A1 | 8/2003 | Yu | |
| 2003/0200464 A1 | 10/2003 | Kidron | |
| 2003/0226002 A1 | 12/2003 | Boutaud et al. | |
| 2004/0100980 A1 | 5/2004 | Jacobs et al. | |
| 2004/0125807 A1 | 7/2004 | Liu et al. | |
| 2004/0151211 A1 | 8/2004 | Snider | |
| 2004/0184662 A1 | 9/2004 | Kravec et al. | |
| 2005/0154916 A1 | 7/2005 | Boulanger et al. | |
| 2005/0251638 A1 | 11/2005 | Boutaud et al. | |
| 2006/0158219 A1 | 7/2006 | Sunkavalli et al. | |
| 2006/0195496 A1 | 8/2006 | Vadi et al. | |
| 2006/0206875 A1 | 9/2006 | Ullmann et al. | |
| 2006/0257043 A1 | 11/2006 | Chiu | |
| 2006/0274001 A1 | 12/2006 | Guttag et al. | |
| 2006/0288070 A1 | 12/2006 | Vadi et al. | |
| 2007/0005869 A1 | 1/2007 | Balraj et al. | |
| 2007/0075878 A1 | 4/2007 | Furodet et al. | |
| 2007/0127482 A1 | 6/2007 | Harris et al. | |
| 2007/0150623 A1 | 6/2007 | Kravec et al. | |
| 2007/0282833 A1 | 12/2007 | McMillen | |
| 2007/0283108 A1 | 12/2007 | Isherwood et al. | |
| 2008/0005796 A1 * | 1/2008 | Godwood | G06F 21/564 |
| | | | 726/24 |
| 2008/0040571 A1 | 2/2008 | Ferraiolo et al. | |
| 2008/0126690 A1 | 5/2008 | Rajan et al. | |
| 2008/0129334 A1 | 6/2008 | Sunkavalli et al. | |
| 2008/0133874 A1 | 6/2008 | Capek et al. | |
| 2008/0140661 A1 | 6/2008 | Pandya | |
| 2008/0178031 A1 | 7/2008 | Dong-Han | |
| 2008/0256347 A1 | 10/2008 | Eickemeyer et al. | |
| 2008/0301796 A1 * | 12/2008 | Holostov | H04L 63/145 |
| | | | 726/12 |
| 2008/0320053 A1 | 12/2008 | Iijima et al. | |
| 2009/0044273 A1 | 2/2009 | Zhou et al. | |
| 2009/0198952 A1 | 8/2009 | Khmelnitsky et al. | |
| 2009/0204734 A1 | 8/2009 | Strait et al. | |
| 2010/0100691 A1 | 4/2010 | Noyes et al. | |
| 2010/0100714 A1 | 4/2010 | Noyes et al. | |
| 2010/0115173 A1 | 5/2010 | Noyes | |
| 2010/0115347 A1 | 5/2010 | Noyes | |
| 2010/0118425 A1 | 5/2010 | Rafaelof | |
| 2010/0138432 A1 | 6/2010 | Noyes | |
| 2010/0138575 A1 | 6/2010 | Noyes | |
| 2010/0138634 A1 | 6/2010 | Noyes | |
| 2010/0138635 A1 | 6/2010 | Noyes | |
| 2010/0175130 A1 | 6/2010 | Pawlowski | |
| 2010/0174887 A1 | 7/2010 | Pawlowski | |
| 2010/0174929 A1 | 7/2010 | Pawlowski | |
| 2010/0185647 A1 | 7/2010 | Noyes | |
| 2010/0145182 A1 | 10/2010 | Schmidt et al. | |

(56) References Cited

U.S. PATENT DOCUMENTS

| | | |
|---|---|---|
| 2010/0325352 A1 | 12/2010 | Schuette et al. |
| 2010/0332809 A1 | 12/2010 | Noyes et al. |
| 2011/0004578 A1 | 1/2011 | Momma et al. |
| 2011/0145182 A1 | 6/2011 | Dlugosch et al. |
| 2011/0145271 A1 | 6/2011 | Noyes et al. |
| 2011/0145544 A1 | 6/2011 | Noyes et al. |
| 2011/0161620 A1 | 6/2011 | Kaminski et al. |
| 2011/0208900 A1 | 8/2011 | Schuette et al. |
| 2011/0258360 A1 | 10/2011 | Noyes |
| 2011/0307233 A1 | 12/2011 | Tseng et al. |
| 2011/0307433 A1 | 12/2011 | Dlugosch |
| 2011/0307503 A1 | 12/2011 | Dlugosch |
| 2011/0320759 A1 | 12/2011 | Craddock et al. |
| 2012/0179854 A1 | 7/2012 | Noyes |
| 2012/0192163 A1 | 7/2012 | Glendenning et al. |
| 2012/0192164 A1 | 7/2012 | Xu et al. |
| 2012/0192165 A1 | 7/2012 | Xu et al. |
| 2012/0192166 A1 | 7/2012 | Xu et al. |
| 2013/0154685 A1 | 6/2013 | Noyes |
| 2013/0156043 A1 | 6/2013 | Brown et al. |
| 2013/0159239 A1 | 6/2013 | Brown et al. |
| 2013/0159670 A1 | 6/2013 | Noyes |
| 2013/0159671 A1 | 6/2013 | Brown et al. |
| 2013/0275709 A1 | 10/2013 | Gajapathy |
| 2014/0025614 A1 | 1/2014 | Noyes et al. |
| 2014/0025923 A1 | 1/2014 | Klein |
| 2014/0067736 A1 | 3/2014 | Noyes |
| 2014/0204956 A1 | 7/2014 | Brown et al. |
| 2014/0225889 A1 | 8/2014 | Kim et al. |
| 2014/0279776 A1 | 9/2014 | Brown et al. |
| 2014/0325494 A1 | 10/2014 | Brown et al. |

FOREIGN PATENT DOCUMENTS

| | | |
|---|---|---|
| JP | 03044779 | 2/1991 |
| JP | 0887462 A | 4/1996 |
| JP | 62006324 | 1/1997 |
| JP | 1069459 A | 3/1998 |
| JP | 10111862 A | 4/1998 |
| JP | 2000231549 A | 8/2000 |
| JP | 2000347708 A | 12/2000 |
| KR | 1020080097573 A | 11/2008 |
| WO | WO0065425 A1 | 11/2000 |
| WO | WO0138978 A1 | 5/2001 |
| WO | WO03039001 A1 | 5/2003 |
| WO | WO2005036750 A1 | 4/2005 |
| WO | WO2011114120 A1 | 9/2011 |

OTHER PUBLICATIONS

Chae et al., "Maskable associative memory design for VLSI pattern inspection," 1987 Symposium on VLSI Circuits, Karuizawa, Japan, 1987, pp. 47-48. (Year: 1987).*
Synchronous DRAM, Micron Technology Inc, 2001, 67 pgs.
Micron Technology, Inc., DDR2 SDRAM, Micron, http://download.micron.com/pdf/datasheets/dram/ddr2/256MbDDR2.pdf, 2003, 4 pgs.
128Mbit GDDR SDRAM, Samsung Electronic, Dec. 2007, 19 pgs.
Synchronous Dynamic Random Access Memory, <http://en.wikipedia.org/wiki/Synchronous_dynamic_random_access_memory>, accessed on May 26, 2010, 20 pgs.
TW Application No. 098145589 Office Action mailed Oct. 14, 2013 and translation, 24 pgs.
JP Application No. 2011-54468 Office Action mailed Aug. 26, 2014 and translation, 14 pgs.
Beesley, K. R.; Arabic Morphology Using Only Finite-State Operations; Xerox Research Centre Europe; pp. 50-57; 1998.
Bird, S. et al.; One-Level Phonology: Autosegmental Representations and Rules as Finite Automata; Association for Computational Linguistics; University of Edinburgh; vol. 20; No. 1; pp. 55-90; 1994.
Bispo, J. et al.; Regular Expression Matching for Reconfigurable Packet Inspection; IEEE International Conference on Field Programmable Technology; 2006.
Bispo, J. et al.; Synthesis of Regular Expressions Targeting FPGAs: Current Status and Open Issues; IST/INESC-ID, Libson, Portugal; pp. 1-12; 2007.
Brodie, B. et al.; A scalable Architecture for High-Throughput Regular-Expression Pattern Matching; Exegy Inc.; pp. 1-12; 2006.
Clark, C.; Design of Efficient FPGA Circuits for Matching Complex Patterns in Network Intrusion Detection Systems (Master of Science Thesis); Georgia Institute of Technology; pp. 1-56; Dec. 2003.
Clark, C.; A Unified Model of Pattern-Matching Circuits for Field-Programmable Gate Arrays [Doctoral Dissertation]; Georgia Institute of Technology; pp. 1-177; 2006.
Clark, C. et al.; Scalable Pattern Matching for High Speed Networks; Proceedings of the $12^{th}$ Annual IEEE symposium on Field-Programmable Custom Computing Machines (FCCM'04);Georgia Institute of Technology; pp. 1-9; 2004.
Clark, C. et al.; A Unified Model of Pattern-Matching Circuit Architectures; Tech Report GIT-CERCS-05-20;Georgia Institute of Technology; pp. 1-17; 2005.
Fide, S.; String Processing in Hardware; Scalable Parallel and Distributed Systems Lab; Proceedings of the $12^{th}$ Annual IEEE symposium on Field-Programmable Custom Computing Machines (FCCM'04); School of Electrical and Computer Engineering; Georgia Institute of Technology; pp. 1-9; 2004.
Fisk, M. et al.; Applying Fast String Matching to Intrusion Detection; Los Alamos National Laboratory; University of California San Diego; pp. 1-21; 2002.
Korenek, J.; Traffic Scanner-Hardware Accelerated Intrusion Detection System; http://www.liberouter.org/ ; 2006.
Kumar, S. et al.; Curing Regular Expressions matching Algorithms from Insomnia, Amnesia, and Acaluia; Department of Computer Science and Engineering; Washington University in St. Louis; pp. 1-17; Apr. 27, 2007.
Lipovski, G.; Dynamic Systolic Associative Memory Chip; IEEE; Department of Electrical and Computer Engineering; University of Texas at Austin; pp. 481-492; 1990.
Lin, C. et al.; Optimization of Pattern Matching Circuits for Regular Expression on FPGA; IEEE Transactions on Very Large Scale Integrations Systems; vol. 15, No. 12, pp. 1-6; Dec. 2007.
Schultz, K. et al.; Fully Parallel Integrated CAM/RAM Using Preclassification to Enable Large Capacities; IEEE Journal on Solid-State Circuits; vol. 31; No. 5; pp. 689-699; May 1996.
Shafai, F. et al.; Fully Parallel 30-MHz, 2.5-Mb CAM; IEEE Journal of Solid-State Circuits, vol. 33; No. 11; pp. 1690-1696; Nov. 1998.
Sidhu, R. et al.; Fast Regular Expression Pattern Matching using FPGAs; Department of EE-Systems; University of Southern California; pp. 1-12; 2001.
Wada, T.; Multiobject Behavior Recognition Event Driven Selective Attention Method; IEEE; pp. 1-16; 2000.
Yu, F.; High Speed Deep Packet Inspection with Hardware Support; Electrical Engineering and Computer Sciences; University of California at Berkeley; pp. 1-217; Nov. 22, 2006.
Freescale and Kaspersky® Accelerated Antivirus Solution Platform for OEM Vendors; Freescale Semiconductors Document; pp. 1-16; 2007.
PCT/US2009/067534 International Search Report and Written Opinion Apr. 26, 2010.
PCT/US2009/061649 International Search Report Feb. 15, 2010.
Taiwan Application No. 098144804 Office Action dated Nov. 4, 2013.
PCT/US2012/067992 International Search Report Mar. 28, 2013.
PCT/US2012/068011 International Search Report Apr. 15, 2013.
PCT/US2012/067999 International Search Report May 14, 2013.
PCT/US2012/067995 International Search Report May 17, 2013.
PCT/US2012/067988 International Search Report (Partial) Jun. 24, 2014.
PCT/US2013/049744 International Search Report and Written Opinion Oct. 22, 2013.
PCT/US2013/049748 International Search Report and Written Opinion Oct. 22, 2013.
PCT/US2013/049755 International Search Report and Written Opinion Oct. 24, 2013.
PCT/US2013/049753 International Search Report and Written Opinion Nov. 7, 2013.

(56) References Cited

OTHER PUBLICATIONS

PCT/US2013/055434 International Search Report and Written Opinion Nov. 29, 2013.
PCT/US2013/055438 International Search Report and Written Opinion Nov. 29, 2013.
PCT/US2013/055436 International Search Report and Written Opinion Dec. 9, 2013.
PCT/US2014/023589 International Search Report and Written Opinion Jul. 24, 2014.
Soewito et al., "Self-Addressable Memory-Based FSM: A scalable Intrusion Detection Engine", IEEE Network, pp. 14-21; Feb. 2009.
Hurson A. R.; A VLSI Design for the Parallel Finite State Automation and Its Performance Evaluation as a Hardware Scanner; International Journal of Computer and Information Sciences, vol. 13, No. 6; 1984.
Carpenter et al., "A Massively Parallel Architecture for a Self-Organizing Neural Pattern Recognition Machine", Academic Press, Inc.; 1987.
Cong et al., "Application-Specific Instruction Generation for Configurable Processor Architectures", Computer Science Department, University of California, ACM; 2004.
Glette et al., "An Online EHW Pattern Recognition System Applied to Face Image Recognition", University of Oslo, Norway; 2007.
Kawai et al., "An Adaptive Pattern Recognition Hardware with On-chip Shift Register-based Partial Reconfiguration", IEEE; 2008.
Kutrib et al., "Massively Parallel Pattern Recognition with Link Features", IFIG Research Report 0003; 2000.
Marculescu et al., Power Management of Multi-Core Systems: Challenges, Approaches, and Recent Developments Tutorial At ASPLOS, London, UK [online]; Mar. 4, 2012.
Vitanen et al.; Image Pattern Recognition Using Configurable Logic Cell Array; New Advances in Computer Graphics; pp. 355-368; 1989.
Yasunaga et al., "Kernel-based Pattern Recognition Hardware: Its Design Methodology Using Evolved Truth Tables", IEEE, 2000.
U.S. Appl. No. 60/652,738, filed Feb. 12, 2005, Harris.
U.S. Appl. No. 61/788,364, filed Mar. 15, 2013, Brown et al.

* cited by examiner

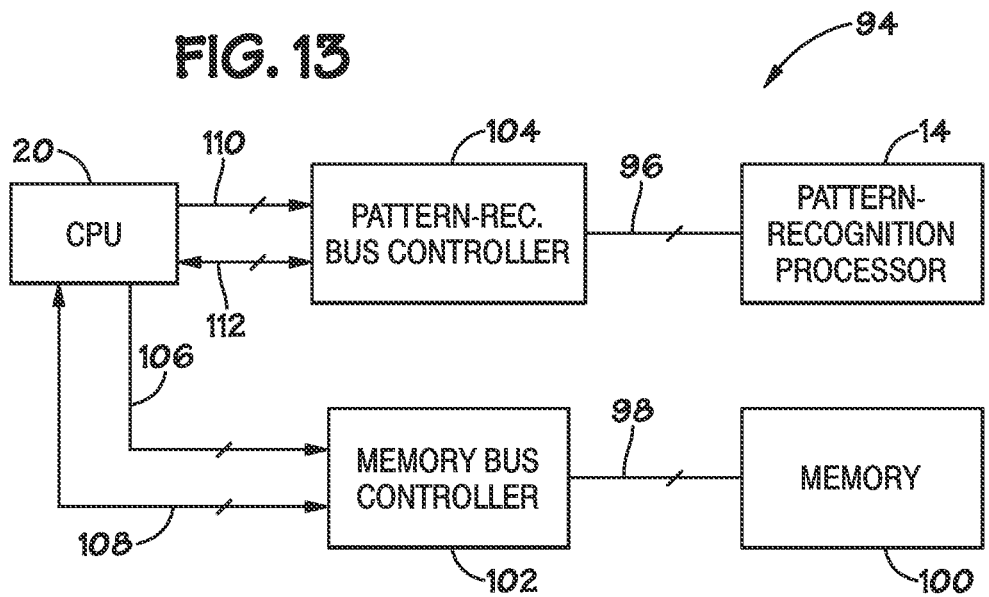
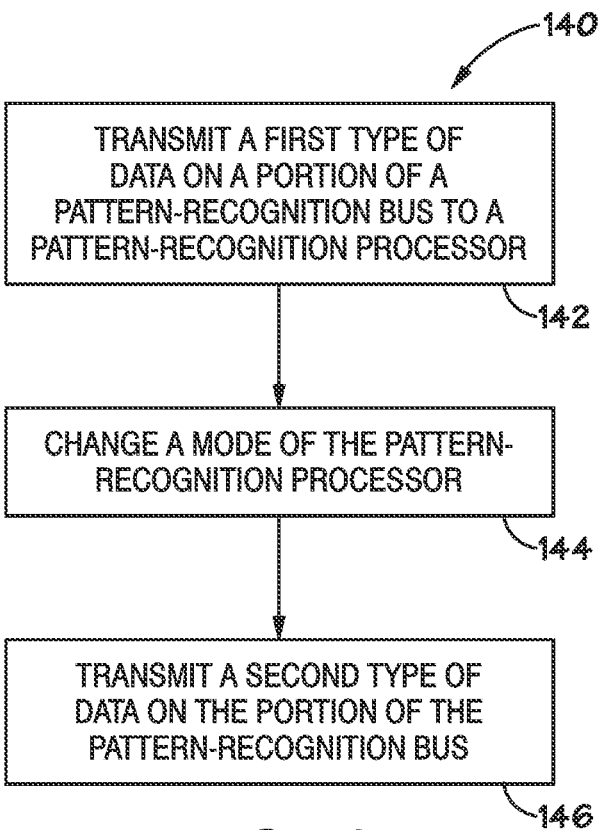

BUSES FOR PATTERN-RECOGNITION PROCESSORS

CROSS-REFERENCE TO RELATED APPLICATIONS

The present application is a continuation of U.S. application Ser. No. 16/249,682, entitled "Buses for Pattern-Recognition Processors," and filed Jan. 16, 2019, now U.S. Pat. No. 11,023,758 which issued on Jun. 1, 2021, which is a continuation of U.S. application Ser. No. 12/350,136, entitled "Buses for Pattern-Recognition Processors," and filed Jan. 7, 2009, the entirety of which is incorporated by reference herein for all purposes.

BACKGROUND

Field of Invention

Embodiments of the invention relate generally to electronic devices and, more specifically, in certain embodiments, to buses for pattern-recognition processors.

Description of Related Art

In the field of computing, pattern recognition tasks are increasingly challenging. Ever larger volumes of data are transmitted between computers, and the number of patterns that users wish to identify is increasing. For example, spam or malware are often detected by searching for patterns in a data stream, e.g., particular phrases or pieces of code. The number of patterns increases with the variety of spam and malware, as new patterns may be implemented to search for new variants. Searching a data stream for each of these patterns can form a computing bottleneck. Often, as the data stream is received, it is searched for each pattern, one at a time. The delay before the system is ready to search the next portion of the data stream increases with the number of patterns. Thus, pattern recognition may slow the receipt of data.

Data streams may be quickly searched for a large number of patterns with hardware, e.g., chips, specifically designed for pattern recognition. Implementation of this hardware, however, is complicated by the lack of a widely accepted communication protocol between dedicated pattern-recognition hardware and central processing units (CPUs). Designers of systems have a finite capacity to learn new communication protocols. Attaining familiarity with even one communication protocol may take months or years of work in the field of computer design. Using a new protocol to communicate with pattern-recognition hardware may add to the cost of implementing that hardware.

BRIEF DESCRIPTION OF DRAWINGS

FIG. 13 illustrates an embodiment of a system with a pattern-recognition bus and a memory bus that are similar or identical in accordance with an embodiment of the present technique;

FIG. 15 illustrates an embodiment of a process for sending multiple types of signal through a portion of a bus in accordance with an embodiment of the present technique.

DETAILED DESCRIPTION

Figure 1:
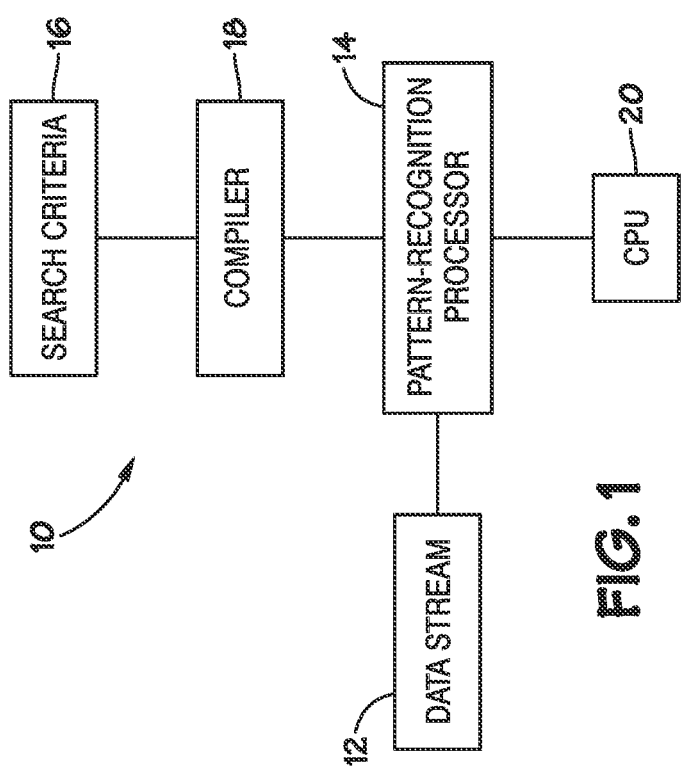
FIG. 1 depicts an example of system that searches a data stream.

FIG. 1 depicts an example of a system 10 that searches a data stream 12. The system 10 may include a pattern-recognition processor 14 that searches the data stream 12 according to search criteria 16.

Each search criterion may specify one or more target expressions, i.e., patterns. The phrase "target expression" refers to a sequence of data for which the pattern-recognition processor 14 is searching. Examples of target expressions include a sequence of characters that spell a certain word, a sequence of genetic base pairs that specify a gene, a sequence of bits in a picture or video file that form a portion of an image, a sequence of bits in an executable file that form a part of a program, or a sequence of bits in an audio file that form a part of a song or a spoken phrase.

A search criterion may specify more than one target expression. For example, a search criterion may specify all five-letter words beginning with the sequence of letters "cl", any word beginning with the sequence of letters "cl", a paragraph that includes the word "cloud" more than three times, etc. The number of possible sets of target expressions is arbitrarily large, e.g., there may be as many target expressions as there are permutations of data that the data stream could present. The search criteria may be expressed in a variety of formats, including as regular expressions, a programming language that concisely specifies sets of target expressions without necessarily listing each target expression.

Each search criterion may be constructed from one or more search terms. Thus, each target expression of a search criterion may include one or more search terms and some target expression may use common search terms. As used herein, the phrase "search term" refers to a sequence of data that is searched for, during a single search cycle. The sequence of data may include multiple bits of data in a binary format or other formats, e.g., base ten, ASCII, etc. The sequence may encode the data with a single digit or multiple digits, e.g., several binary digits. For example, the pattern-recognition processor 14 may search a text data stream 12 one character at a time, and the search terms may specify a set of single characters, e.g., the letter "a", either the letters "a" or "e", or a wildcard search term that specifies a set of all single characters.

Search terms may be smaller or larger than the number of bits that specify a character (or other grapheme—i.e., fundamental unit—of the information expressed by the data stream, e.g., a musical note, a genetic base pair, a base-10 digit, or a sub-pixel). For instance, a search term may be 8 bits and a single character may be 16 bits, in which case two consecutive search terms may specify a single character.

The search criteria 16 may be formatted for the pattern-recognition processor 14 by a compiler 18. Formatting may include deconstructing search terms from the search criteria. For example, if the graphemes expressed by the data stream 12 are larger than the search terms, the compiler may deconstruct the search criterion into multiple search terms to search for a single grapheme. Similarly, if the graphemes expressed by the data stream 12 are smaller than the search terms, the compiler 18 may provide a single search term, with unused bits, for each separate grapheme. The compiler 18 may also format the search criteria 16 to support various regular expressions operators that are not natively supported by the pattern-recognition processor 14.

The pattern-recognition processor 14 may search the data stream 12 by evaluating each new term from the data stream 12. The word "term" here refers to the amount of data that could match a search term. During a search cycle, the pattern-recognition processor 14 may determine whether the currently presented term matches the current search term in the search criterion. If the term matches the search term, the evaluation is "advanced", i.e., the next term is compared to the next search term in the search criterion. If the term does not match, the next term is compared to the first term in the search criterion, thereby resetting the search.

Each search criterion may be compiled into a different finite state machine in the pattern-recognition processor 14. The finite state machines may run in parallel, searching the data stream 12 according to the search criteria 16. The finite state machines may step through each successive search term in a search criterion as the preceding search term is matched by the data stream 12, or if the search term is unmatched, the finite state machines may begin searching for the first search term of the search criterion.

The pattern-recognition processor 14 may evaluate each new term according to several search criteria, and their respective search terms, at about the same time, e.g., during a single device cycle. The parallel finite state machines may each receive the term from the data stream 12 at about the same time, and each of the parallel finite state machines may determine whether the term advances the parallel finite state machine to the next search term in its search criterion. The parallel finite state machines may evaluate terms according to a relatively large number of search criteria, e.g., more than 100, more than 1000, or more than 10,000. Because they operate in parallel, they may apply the search criteria to a data stream 12 having a relatively high bandwidth, e.g., a data stream 12 of greater than or generally equal to 64 MB per second or 128 MB per second, without slowing the data stream. In some embodiments, the search-cycle duration does not scale with the number of search criteria, so the number of search criteria may have little to no effect on the performance of the pattern-recognition processor 14.

When a search criterion is satisfied (i.e., after advancing to the last search term and matching it), the pattern-recognition processor 14 may report the satisfaction of the criterion to a processing unit, such as a central processing unit (CPU) 20. The central processing unit 20 may control the pattern-recognition processor 14 and other portions of the system 10.

The system 10 may be any of a variety of systems or devices that search a stream of data. For example, the system 10 may be a desktop, laptop, handheld or other type of computer that monitors the data stream 12. The system 10 may also be a network node, such as a router, a server, or a client (e.g., one of the previously-described types of computers). The system 10 may be some other sort of electronic device, such as a copier, a scanner, a printer, a game console, a television, a set-top video distribution or recording system, a cable box, a personal digital media player, a factory automation system, an automotive computer system, or a medical device. (The terms used to describe these various examples of systems, like many of the other terms used herein, may share some referents and, as such, should not be construed narrowly in virtue of the other items listed.)

The data stream 12 may be one or more of a variety of types of data streams that a user or other entity might wish to search. For example, the data stream 12 may be a stream of data received over a network, such as packets received over the Internet or voice or data received over a cellular network. The data stream 12 may be data received from a sensor in communication with the system 10, such as an imaging sensor, a temperature sensor, an accelerometer, or the like, or combinations thereof. The data stream 12 may be received by the system 10 as a serial data stream, in which the data is received in an order that has meaning, such as in a temporally, lexically, or semantically significant order. Alternatively, the data stream 12 may be received in parallel or out of order and, then, converted into a serial data stream, e.g., by reordering packets received over the Internet. In some embodiments, the data stream 12 may present terms serially, but the bits expressing each of the terms may be received in parallel. The data stream 12 may be received from a source external to the system 10, or may be formed by interrogating a memory device and forming the data stream 12 from stored data.

Depending on the type of data in the data stream 12, different types of search criteria may be chosen by a designer. For instance, the search criteria 16 may be a virus definition file. Viruses or other malware may be characterized, and aspects of the malware may be used to form search criteria that indicate whether the data stream 12 is likely delivering malware. The resulting search criteria may be stored on a server, and an operator of a client system may subscribe to a service that downloads the search criteria to the system 10. The search criteria 16 may be periodically updated from the server as different types of malware emerge. The search criteria may also be used to specify undesirable content that might be received over a network, for instance unwanted emails (commonly known as spam) or other content that a user finds objectionable.

The data stream 12 may be searched by a third party with an interest in the data being received by the system 10. For example, the data stream 12 may be monitored for text, a sequence of audio, or a sequence of video that occurs in a copyrighted work. The data stream 12 may be monitored for utterances that are relevant to a criminal investigation or civil proceeding or are of interest to an employer.

The search criteria 16 may also include patterns in the data stream 12 for which a translation is available, e.g., in memory addressable by the CPU 20 or the pattern-recognition processor 14. For instance, the search criteria 16 may each specify an English word for which a corresponding Spanish word is stored in memory. In another example, the search criteria 16 may specify encoded versions of the data stream 12, e.g., MP3, MPEG 4, FLAC, Ogg Vorbis, etc., for which a decoded version of the data stream 12 is available, or vice versa.

The pattern recognition processor 14 may be a hardware device that is integrated with the CPU 20 into a single component (such as a single device) or may be formed as a separate component. For instance, the pattern-recognition processor 14 may be a separate integrated circuit. The pattern-recognition processor 14 may be referred to as a "co-processor" or a "pattern-recognition co-processor".

Figure 2:
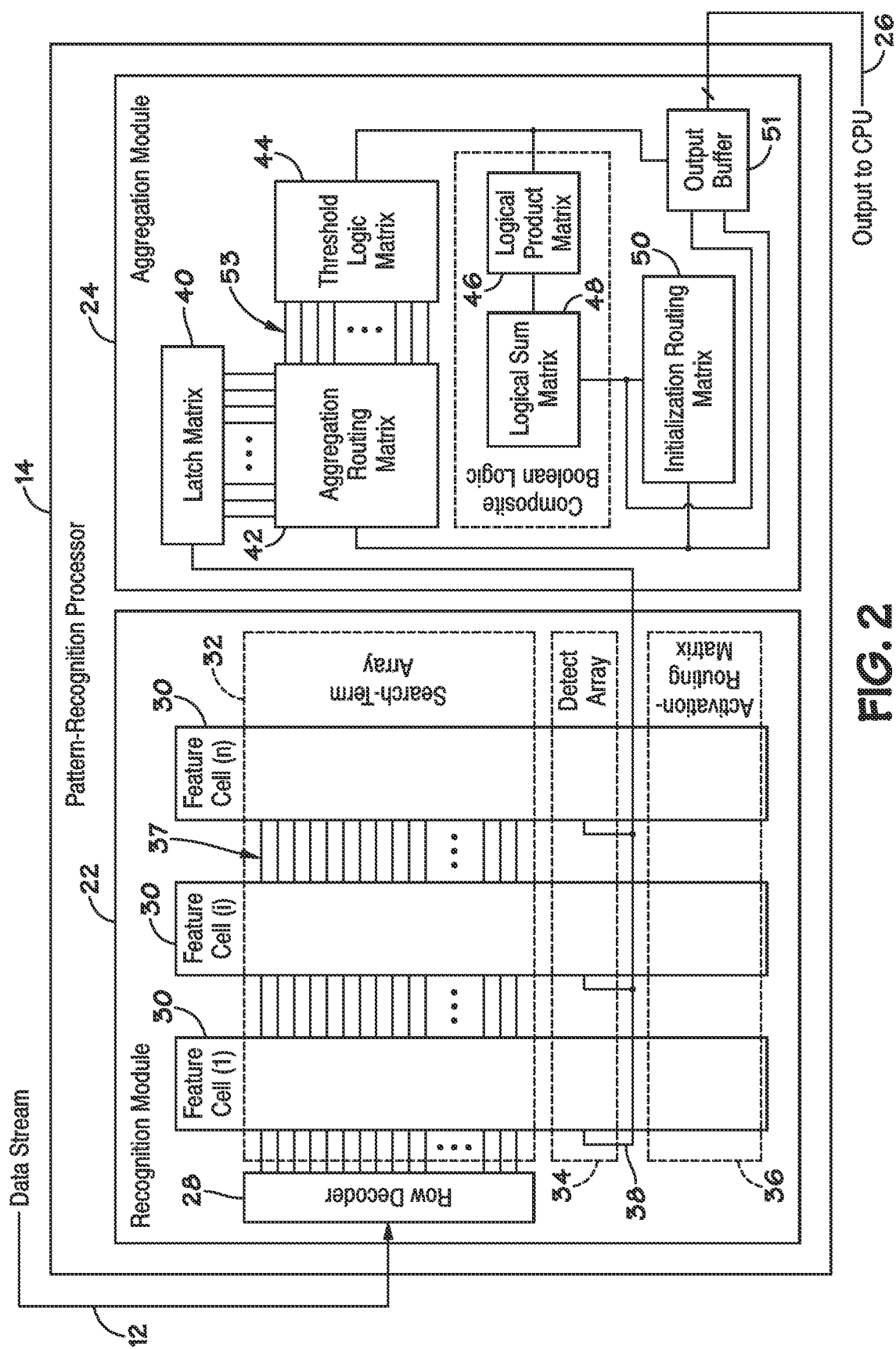
FIG. 2 depicts an example of a pattern-recognition processor in the system of FIG. 1.

FIG. 2 depicts an example of the pattern-recognition processor 14. The pattern-recognition processor 14 may include a recognition module 22 and an aggregation module 24. The recognition module 22 may be configured to compare received terms to search terms, and both the recognition module 22 and the aggregation module 24 may cooperate to determine whether matching a term with a search term satisfies a search criterion.

The recognition module 22 may include a row decoder 28 and a plurality of feature cells 30. Each feature cell 30 may specify a search term, and groups of feature cells 30 may form a parallel finite state machine that forms a search criterion. Components of the feature cells 30 may form a search-term array 32, a detection array 34, and an activation-routing matrix 36. The search-term array 32 may include a plurality of input conductors 37, each of which may place each of the feature cells 30 in communication with the row decoder 28.

The row decoder 28 may select particular conductors among the plurality of input conductors 37 based on the content of the data stream 12. For example, the row decoder 28 may be a one byte to 256 row decoder that activates one of 256 rows based on the value of a received byte, which may represent one term. A one-byte term of 0000 0000 may correspond to the top row among the plurality of input conductors 37, and a one-byte term of 1111 1111 may correspond to the bottom row among the plurality of input conductors 37. Thus, different input conductors 37 may be selected, depending on which terms are received from the data stream 12. As different terms are received, the row decoder 28 may deactivate the row corresponding to the previous term and activate the row corresponding to the new term.

The detection array 34 may couple to a detection bus 38 that outputs signals indicative of complete or partial satisfaction of search criteria to the aggregation module 24. The activation-routing matrix 36 may selectively activate and deactivate feature cells 30 based on the number of search terms in a search criterion that have been matched.

The aggregation module 24 may include a latch matrix 40, an aggregation-routing matrix 42, a threshold-logic matrix 44, a logical-product matrix 46, a logical-sum matrix 48, and an initialization-routing matrix 50.

The latch matrix 40 may implement portions of certain search criteria. Some search criteria, e.g., some regular expressions, count only the first occurrence of a match or group of matches. The latch matrix 40 may include latches that record whether a match has occurred. The latches may be cleared during initialization, and periodically re-initialized during operation, as search criteria are determined to be satisfied or not further satisfiable—i.e., an earlier search term may need to be matched again before the search criterion could be satisfied.

The aggregation-routing matrix 42 may function similar to the activation-routing matrix 36. The aggregation-routing matrix 42 may receive signals indicative of matches on the detection bus 38 and may route the signals to different group-logic lines 53 connecting to the threshold-logic matrix 44. The aggregation-routing matrix 42 may also route outputs of the initialization-routing matrix 50 to the detection array 34 to reset portions of the detection array 34 when a search criterion is determined to be satisfied or not further satisfiable.

The threshold-logic matrix 44 may include a plurality of counters, e.g., 32-bit counters configured to count up or down. The threshold-logic matrix 44 may be loaded with an initial count, and it may count up or down from the count based on matches signaled by the recognition module. For instance, the threshold-logic matrix 44 may count the number of occurrences of a word in some length of text.

The outputs of the threshold-logic matrix 44 may be inputs to the logical-product matrix 46. The logical-product matrix 46 may selectively generate "product" results (e.g., "AND" function in Boolean logic). The logical-product matrix 46 may be implemented as a square matrix, in which the number of output products is equal the number of input lines from the threshold-logic matrix 44, or the logical-product matrix 46 may have a different number of inputs than outputs. The resulting product values may be output to the logical-sum matrix 48.

The logical-sum matrix 48 may selectively generate sums (e.g., "OR" functions in Boolean logic.) The logical-sum matrix 48 may also be a square matrix, or the logical-sum matrix 48 may have a different number of inputs than outputs. Since the inputs are logical products, the outputs of the logical-sum matrix 48 may be logical-Sums-of-Products (e.g., Boolean logic Sum-of-Product (SOP) form). The output of the logical-sum matrix 48 may be received by the initialization-routing matrix 50.

The initialization-routing matrix 50 may reset portions of the detection array 34 and the aggregation module 24 via the aggregation-routing matrix 42. The initialization-routing matrix 50 may also be implemented as a square matrix, or the initialization-routing matrix 50 may have a different number of inputs than outputs. The initialization-routing matrix 50 may respond to signals from the logical-sum matrix 48 and re-initialize other portions of the pattern-recognition processor 14, such as when a search criterion is satisfied or determined to be not further satisfiable.

The aggregation module 24 may include an output buffer 51 that receives the outputs of the threshold-logic matrix 44, the aggregation-routing matrix 42, and the logical-sum matrix 48. The output of the aggregation module 24 may be transmitted from the output buffer 51 to the CPU 20 (FIG. 1) on the output bus 26. In some embodiments, an output multiplexer may multiplex signals from these components 42, 44, and 48 and output signals indicative of satisfaction of criteria or matches of search terms to the CPU 20 (FIG. 1). In other embodiments, results from the pattern-recognition processor 14 may be reported without transmitting the signals through the output multiplexer, which is not to suggest that any other feature described herein could not also be omitted. For example, signals from the threshold-logic matrix 44, the logical-product matrix 46, the logical-sum matrix 48, or the initialization routing matrix 50 may be transmitted to the CPU in parallel on the output bus 26.

Figure 3:
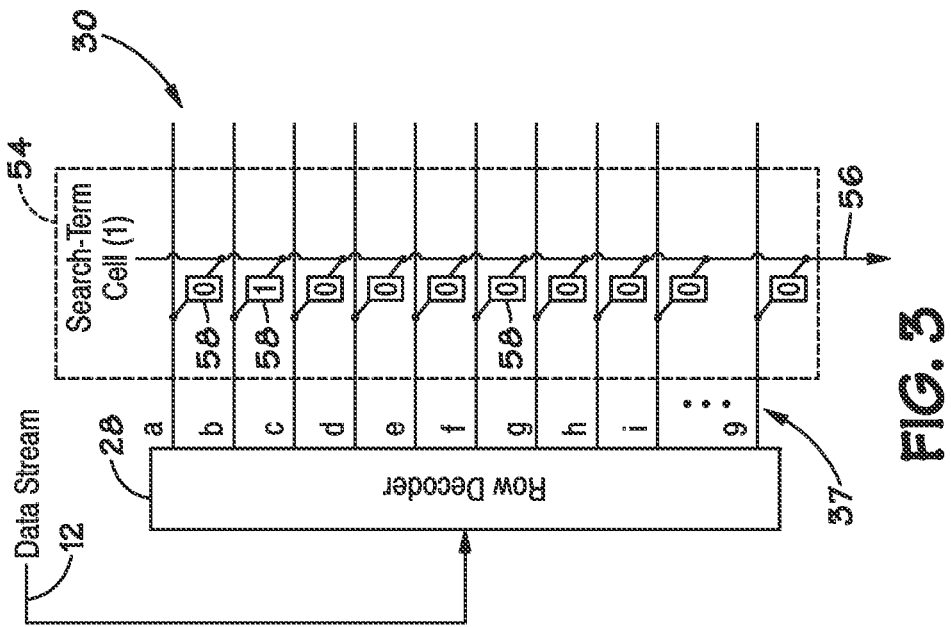
FIG. 3 depicts an example of a search-term cell in the pattern-recognition processor of FIG. 2.

FIG. 3 illustrates a portion of a single feature cell 30 in the search-term array 32 (FIG. 2), a component referred to herein as a search-term cell 54. The search-term cells 54 may include an output conductor 56 and a plurality of memory cells 58. Each of the memory cells 58 may be coupled to both the output conductor 56 and one of the conductors among the plurality of input conductors 37. In response to its input conductor 37 being selected, each of the memory cells 58 may output a value indicative of its stored value, outputting the data through the output conductor 56. In some embodiments, the plurality of input conductors 37 may be referred to as "word lines", and the output conductor 56 may be referred to as a "data line".

The memory cells 58 may include any of a variety of types of memory cells. For example, the memory cells 58 may be volatile memory, such as dynamic random access memory (DRAM) cells having a transistor and a capacitor. The source and the drain of the transistor may be connected to a plate of the capacitor and the output conductor 56, respectively, and the gate of the transistor may be connected to one of the input conductors 37. In another example of volatile memory, each of the memory cells 58 may include a static random access memory (SRAM) cell. The SRAM cell may have an output that is selectively coupled to the output conductor 56 by an access transistor controlled by one of the input conductors 37. The memory cells 58 may also include nonvolatile memory, such as phase-change memory (e.g., an ovonic device), flash memory, silicon-oxide-nitride-oxide-silicon (SONOS) memory, magneto-resistive memory, or other types of nonvolatile memory. The memory cells 58 may also include flip-flops, e.g., memory cells made out of logic gates.

Figure 5:
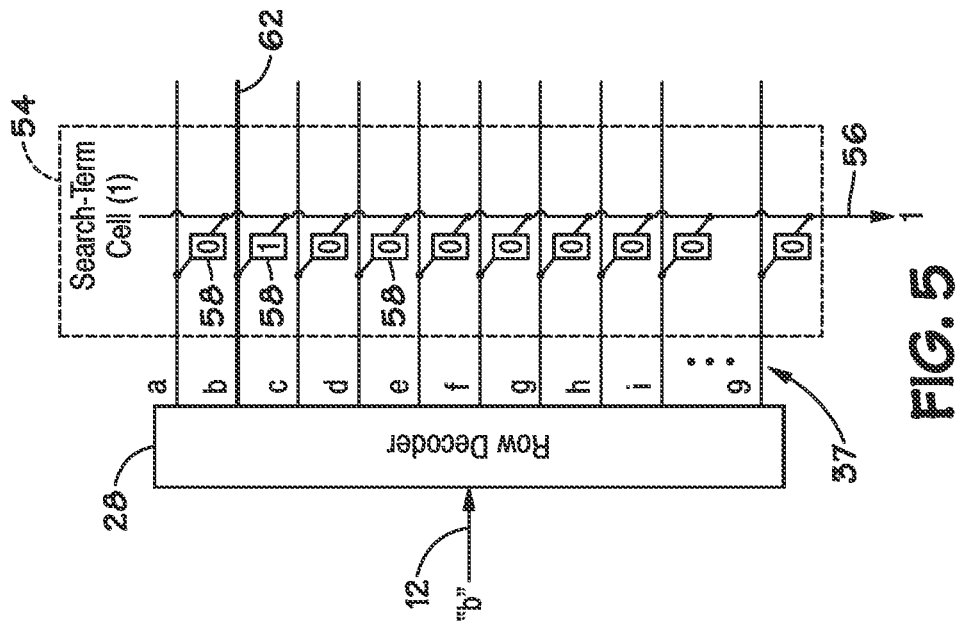
FIGS. 4 and 5 depict the search-term cell of FIG. 3 searching the data stream for a single character.
Figure 4:
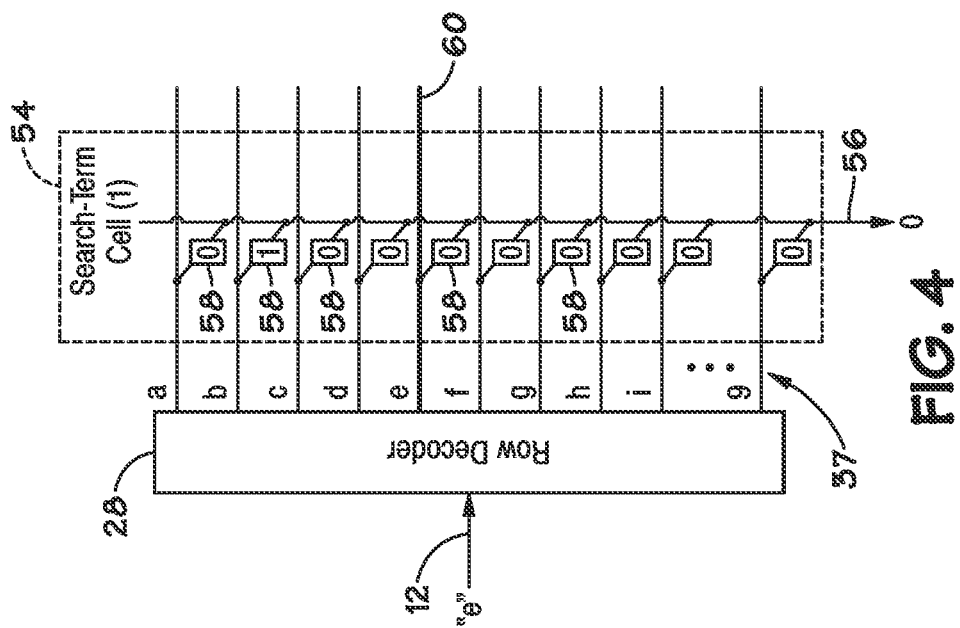

FIGS. 4 and 5 depict an example of the search-term cell 54 in operation. FIG. 4 illustrates the search-term cell 54 receiving a term that does not match the cell's search term, and FIG. 5 illustrates a match.

As illustrated by FIG. 4, the search-term cell 54 may be configured to search for one or more terms by storing data in the memory cells 58. The memory cells 58 may each represent a term that the data stream 12 might present, e.g., in FIG. 3, each memory cell 58 represents a single letter or number, starting with the letter "a" and ending with the number "9". Memory cells 58 representing terms that satisfy the search term may be programmed to store a first value, and memory cells 58 that do not represent terms that satisfy the search term may be programmed to store a different value. In the illustrated example, the search-term cell 54 is configured to search for the letter "b". The memory cells 58 that represent "b" may store a 1, or logic high, and the memory cells 58 that do not represent "b" may be programmed to store a 0, or logic low.

To compare a term from the data stream 12 with the search term, the row decoder 28 may select the input conductor 37 coupled to memory cells 58 representing the received term. In FIG. 4, the data stream 12 presents a lowercase "e". This term may be presented by the data stream 12 in the form of an eight-bit ASCII code, and the row decoder 28 may interpret this byte as a row address, outputting a signal on the conductor 60 by energizing it.

In response, the memory cell 58 controlled by the conductor 60 may output a signal indicative of the data that the memory cell 58 stores, and the signal may be conveyed by the output conductor 56. In this case, because the letter "e" is not one of the terms specified by the search-term cell 54, it does not match the search term, and the search-term cell 54 outputs a 0 value, indicating no match was found.

In FIG. 5, the data stream 12 presents a character "b". Again, the row decoder 28 may interpret this term as an address, and the row decoder 28 may select the conductor 62. In response, the memory cell 58 representing the letter "b" outputs its stored value, which in this case is a 1, indicating a match.

The search-term cells 54 may be configured to search for more than one term at a time. Multiple memory cells 58 may be programmed to store a 1, specifying a search term that matches with more than one term. For instance, the memory cells 58 representing the letters lowercase "a" and uppercase "A" may be programmed to store a 1, and the search-term cell 54 may search for either term. In another example, the search-term cell 54 may be configured to output a match if any character is received. All of the memory cells 58 may be programmed to store a 1, such that the search-term cell 54 may function as a wildcard term in a search criterion.

Figure 6:
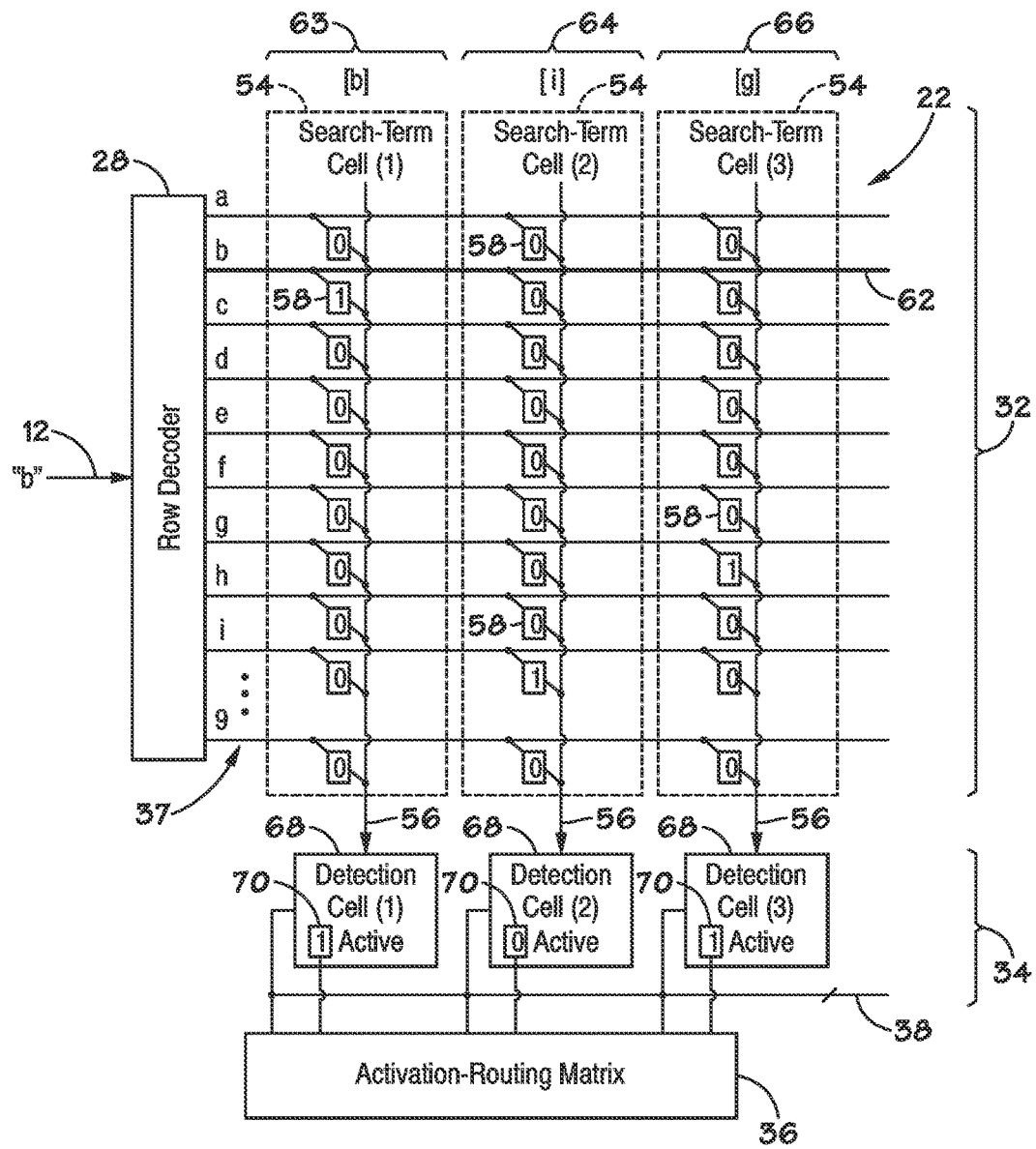
FIGS. 6-8 depict a recognition module including several search-term cells searching the data stream for a word.
Figure 7:
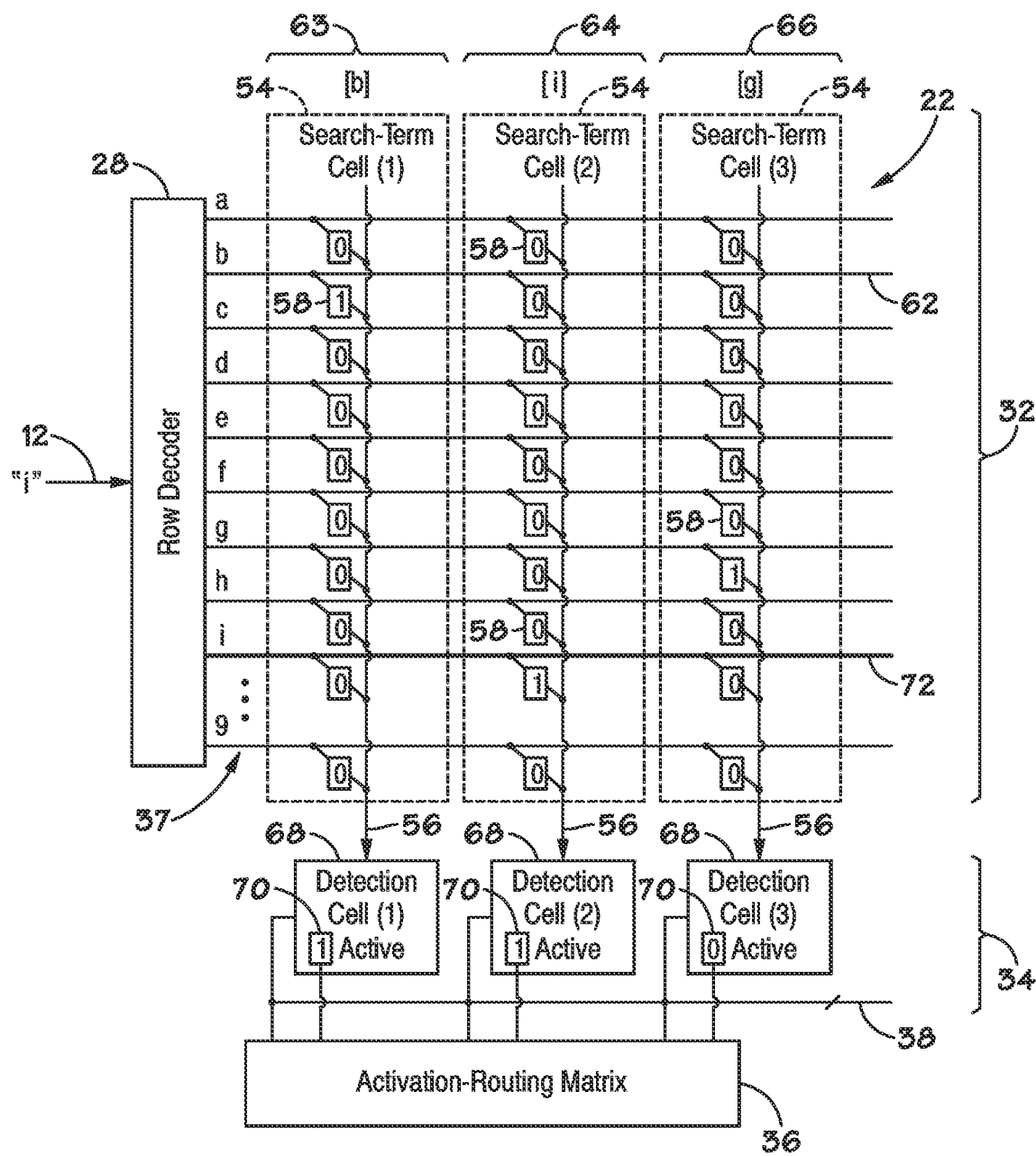
Figure 8:
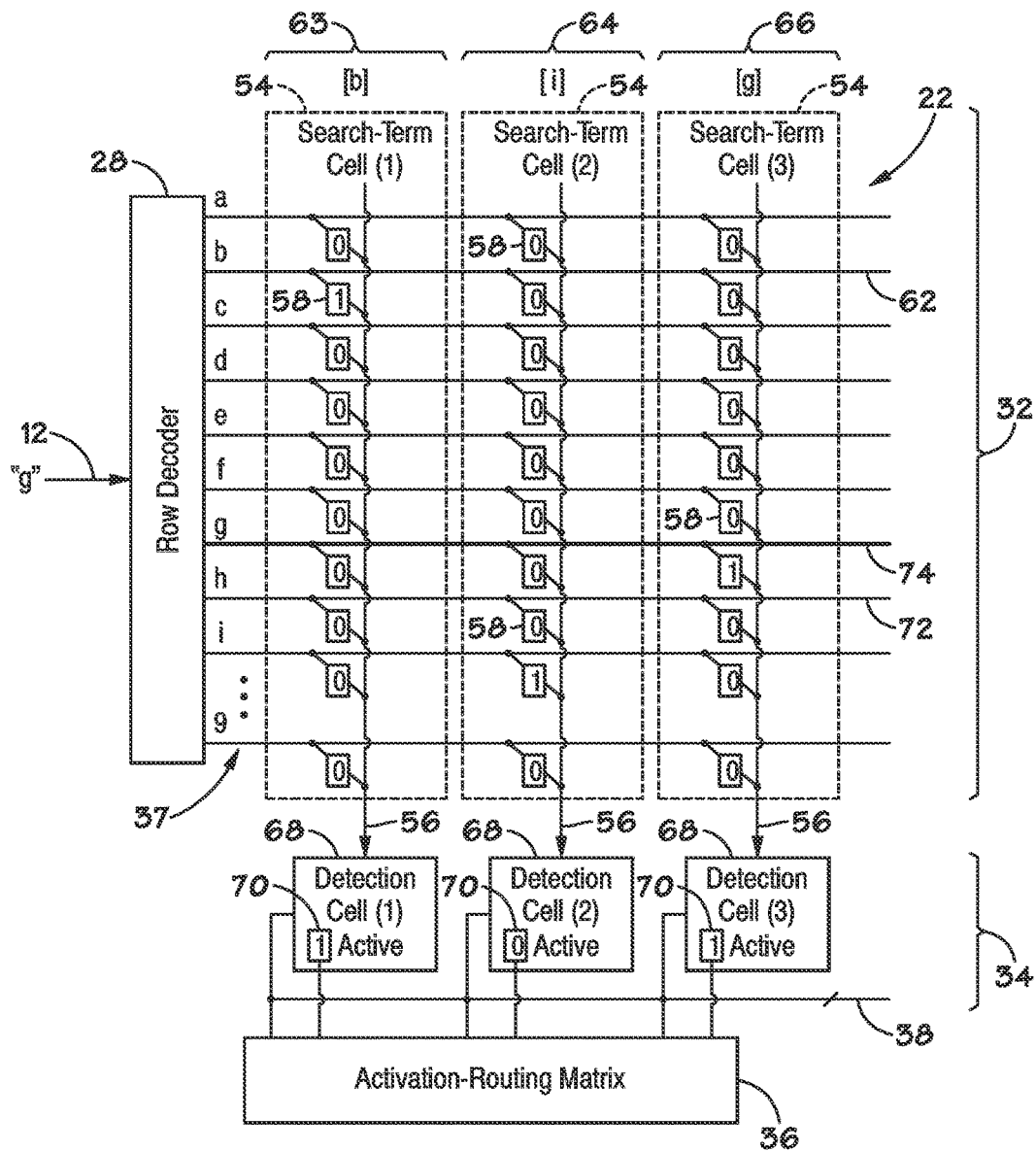

FIGS. 6-8 depict the recognition module 22 searching according to a multi-term search criterion, e.g., for a word. Specifically, FIG. 6 illustrates the recognition module 22 detecting the first letter of a word, FIG. 7 illustrates detection of the second letter, and FIG. 8 illustrates detection of the last letter.

As illustrated by FIG. 6, the recognition module 22 may be configured to search for the word "big". Three adjacent feature cells 63, 64, and 66 are illustrated. The feature cell 63 is configured to detect the letter "b". The feature cell 64 is configured to detect the letter "i". And the feature cell 66 is configured to both detect the letter "g" and indicate that the search criterion is satisfied.

FIG. 6 also depicts additional details of the detection array 34. The detection array 34 may include a detection cell 68 in each of the feature cells 63, 64, and 66. Each of the detection cells 68 may include a memory cell 70, such as one of the types of memory cells described above (e.g., a flip-flop), that indicates whether the feature cell 63, 64, or 66 is active or inactive. The detection cells 68 may be configured to output a signal to the activation-routing matrix 36 indicating whether the detection cell both is active and has received a signal from its associated search-term cell 54 indicating a match. Inactive features cells 63, 64, and 66 may disregard matches. Each of the detection cells 68 may include an AND gate with inputs from the memory cell 70 and the output conductor 56. The output of the AND gate may be routed to both the detection bus 38 and the activation-routing matrix 36, or one or the other.

The activation-routing matrix 36, in turn, may selectively activate the feature cells 63, 64, and 66 by writing to the memory cells 70 in the detection array 34. The activation-routing matrix 36 may activate feature cells 63, 64, or 66 according to the search criterion and which search term is being searched for next in the data stream 12.

In FIG. 6, the data stream 12 presents the letter "b". In response, each of the feature cells 63, 64, and 66 may output a signal on their output conductor 56, indicating the value stored in the memory cell 58 connected to the conductor 62, which represents the letter "b". The detection cells 56 may then each determine whether they have received a signal indicating a match and whether they are active. Because the feature cell 63 is configured to detect the letter "b" and is active, as indicated by its memory cell 70, the detection cell 68 in the feature cell 63 may output a signal to the activation-routing matrix 36 indicating that the first search term of the search criterion has been matched.

As illustrated by FIG. 7, after the first search term is matched, the activation-routing matrix 36 may activate the next feature cell 64 by writing a 1 to its memory cell 70 in its detection cell 68. The activation-routing matrix 36 may also maintain the active state of the feature cell 63, in case the next term satisfies the first search term, e.g., if the sequence of terms "bbig" is received. The first search term of search criteria may be maintained in an active state during a portion or substantially all of the time during which the data stream 12 is searched.

In FIG. 7, the data stream 12 presents the letter "i" to the recognition module 22. In response, each of the feature cells 63, 64, and 66 may output a signal on their output conductor 56, indicating the value stored in the memory cell 58 connected to the conductor 72, which represents the letter "i". The detection cells 56 may then each determine whether they have received a signal indicating a match and whether they are active. Because the feature cell 64 is configured to detect the letter "i" and is active, as indicated by its memory cell 70, the detection cell 68 in the feature cell 64 may output a signal to the activation-routing matrix 36 indicating that the next search term of its search criterion has been matched.

Next, the activation-routing matrix 36 may activate the feature cell 66, as illustrated by FIG. 8. Before evaluating the next term, the feature cell 64 may be deactivated. The feature cell 64 may be deactivated by its detection cell 68 resetting its memory cell 70 between detection cycles or the activation-routing matrix 36 may deactivate the feature cell 64, for example.

In FIG. 8, the data stream 12 presents the term "g" to the row decoder 28, which selects the conductor 74 representing the term "g". In response, each of the feature cells 63, 64, and 66 may output a signal on their output conductor 56, indicating the value stored in the memory cell 58 connected to the conductor 74, which represents the letter "g". The detection cells 56 may then each determine whether they have received a signal indicating a match and whether they are active. Because the feature cell 66 is configured to detect the letter "g" and is active, as indicated by its memory cell 70, the detection cell 68 in the feature cell 66 may output a signal to the activation routing matrix 36 indicating that the last search term of its search criterion has been matched.

The end of a search criterion or a portion of a search criterion may be identified by the activation-routing matrix 36 or the detection cell 68. These components 36 or 68 may include memory indicating whether their feature cell 63, 64, or 66 specifies the last search term of a search criterion or a component of a search criterion. For example, a search criterion may specify all sentences in which the word "cattle" occurs twice, and the recognition module may output a signal indicating each occurrence of "cattle" within a sentence to the aggregation module, which may count the occurrences to determine whether the search criterion is satisfied.

Feature cells 63, 64, or 66 may be activated under several conditions. A feature cell 63, 64, or 66 may be "always active", meaning that it remains active during all or substantially all of a search. An example of an always active feature cell 63, 64, or 66 is the first feature cell of the search criterion, e.g., feature cell 63.

A feature cell 63, 64, or 66 may be "active when requested", meaning that the feature cell 63, 64, or 66 is active when some condition precedent is matched, e.g., when the preceding search terms in a search criterion are matched. An example is the feature cell 64, which is active when requested by the feature cell 63 in FIGS. 6-8, and the feature cell 66, which active when requested by the feature cell 64.

A feature cell 63, 64, or 66 may be "self activated", meaning that once it is activated, it activates itself as long as its search term is matched. For example, a self activated feature cell having a search term that is matched by any numerical digit may remain active through the sequence "123456xy" until the letter "x" is reached. Each time the search term of the self activated feature cell is matched, it may activate the next feature cell in the search criterion. Thus, an always active feature cell may be formed from a self activating feature cell and an active when requested feature cell: the self activating feature cell may be programmed with all of its memory cells 58 storing a 1, and it may repeatedly activate the active when requested feature cell after each term. In some embodiments, each feature cell 63, 64, and 66 may include a memory cell in its detection cell 68 or in the activation-routing matrix 36 that specifies whether the feature cell is always active, thereby forming an always active feature cell from a single feature cell.

Figure 9:
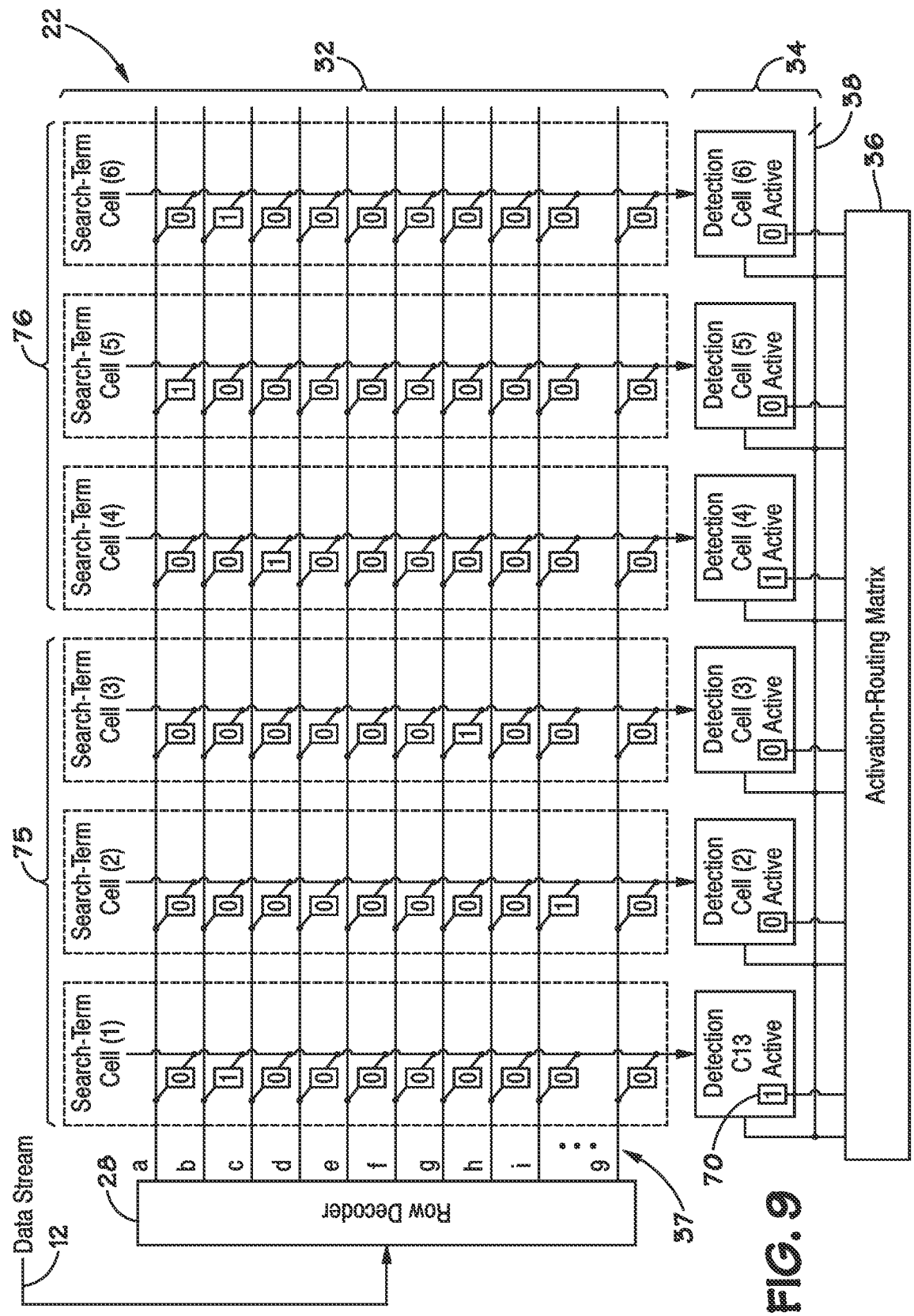
FIG. 9 depicts the recognition module configured to search the data stream for two words in parallel.

FIG. 9 depicts an example of a recognition module 22 configured to search according to a first search criterion 75 and a second search criterion 76 in parallel. In this example, the first search criterion 75 specifies the word "big", and the second search criterion 76 specifies the word "cab". A signal indicative of the current term from the data stream 12 may be communicated to feature cells in each search criterion 75 and 76 at generally the same time. Each of the input conductors 37 spans both of the search criteria 75 and 76. As a result, in some embodiments, both of the search criteria 75 and 76 may evaluate the current term generally simultaneously. This is believed to speed the evaluation of search criteria. Other embodiments may include more feature cells configured to evaluate more search criteria in parallel. For example, some embodiments may include more than 100, 500, 1000, 5000, or 10,000 feature cells operating in parallel. These feature cells may evaluate hundreds or thousands of search criteria generally simultaneously.

Search criteria with different numbers of search terms may be formed by allocating more or fewer feature cells to the search criteria. Simple search criteria may consume fewer resources in the form of feature cells than complex search criteria. This is believed to reduce the cost of the pattern-recognition processor 14 (FIG. 2) relative to processors with a large number of generally identical cores, all configured to evaluate complex search criteria.

Figure 10:
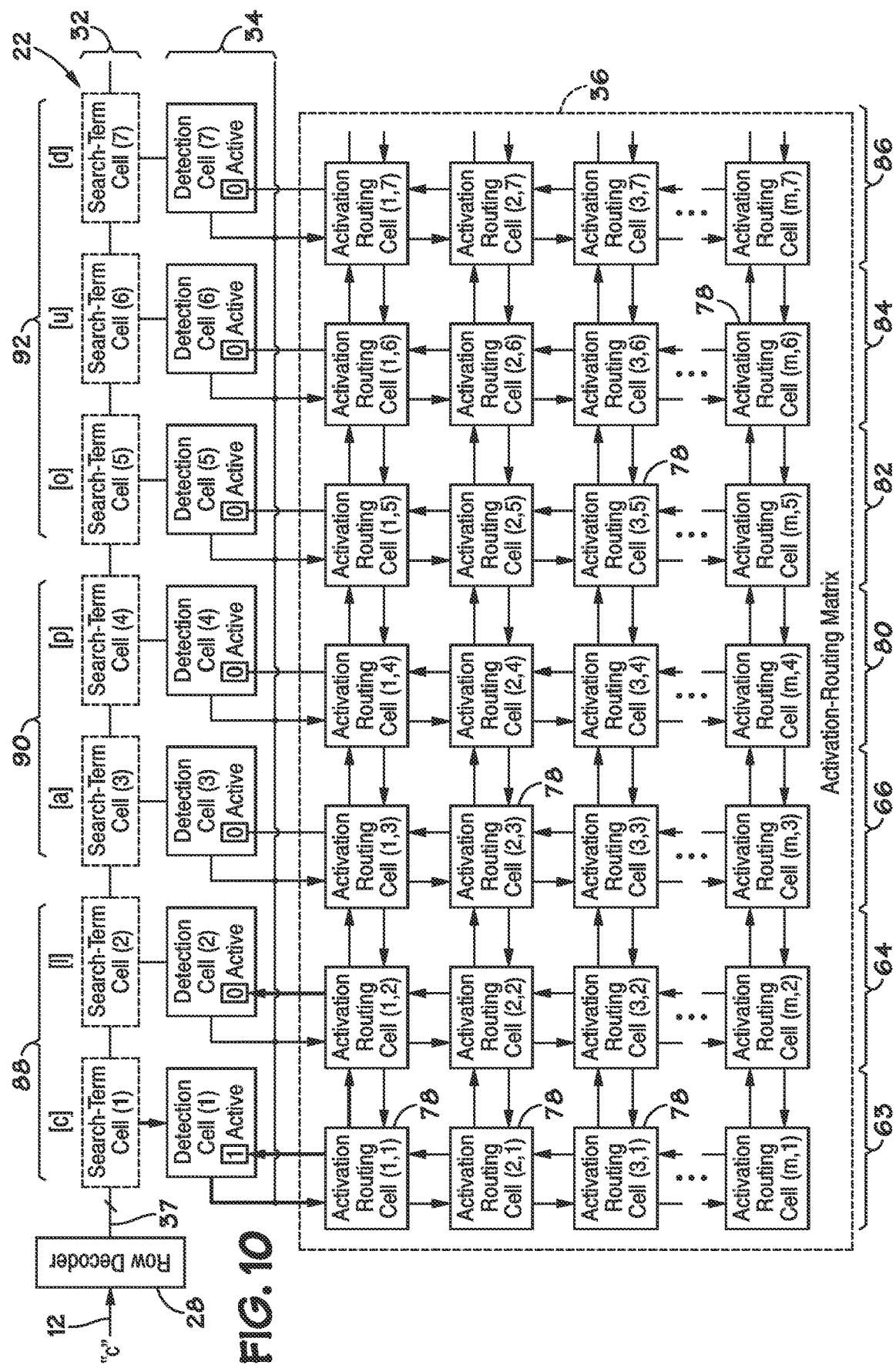
FIGS. 10-12 depict the recognition module searching according to a search criterion that specifies multiple words with the same prefix.
Figure 11:
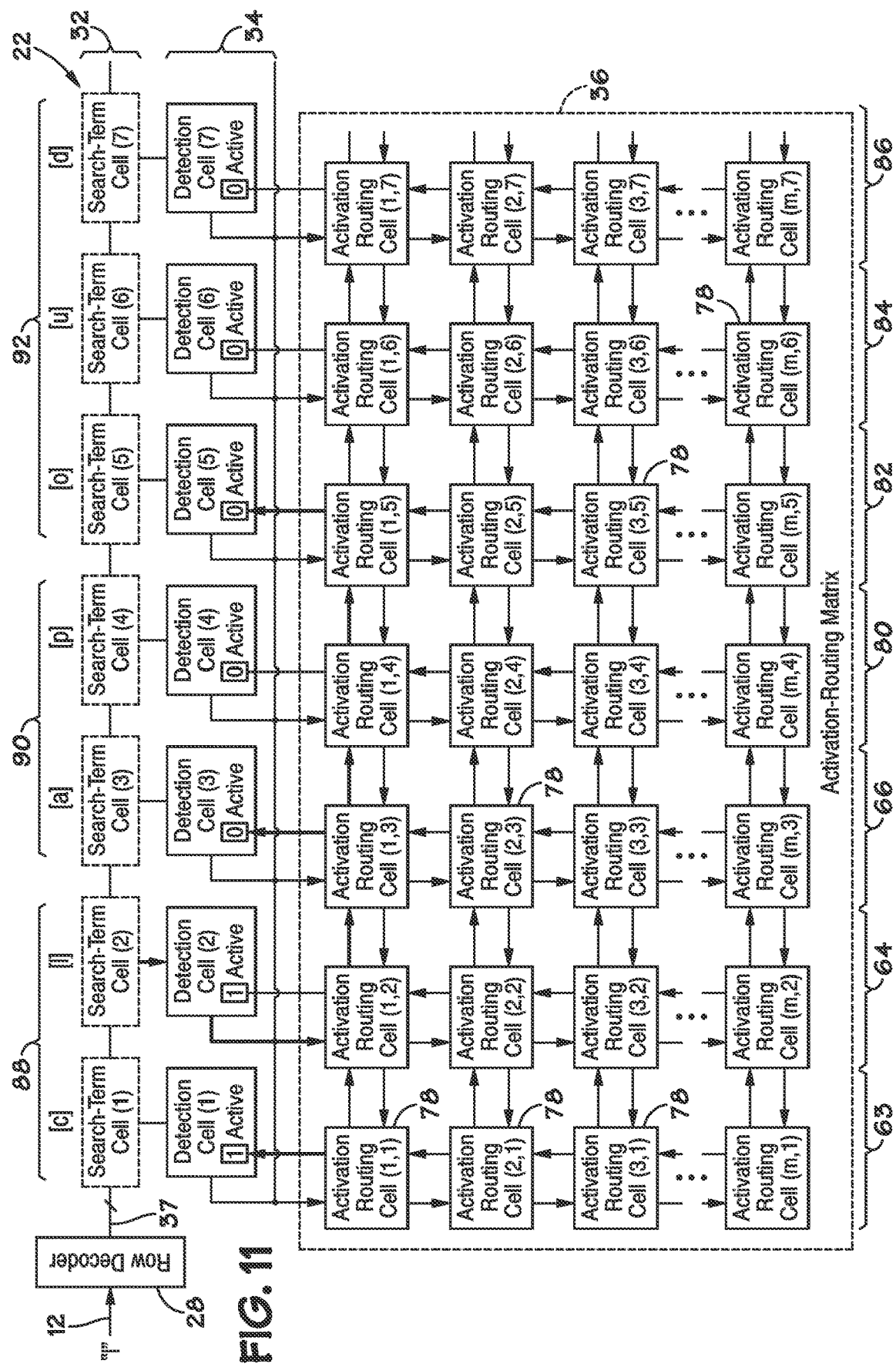
Figure 12:
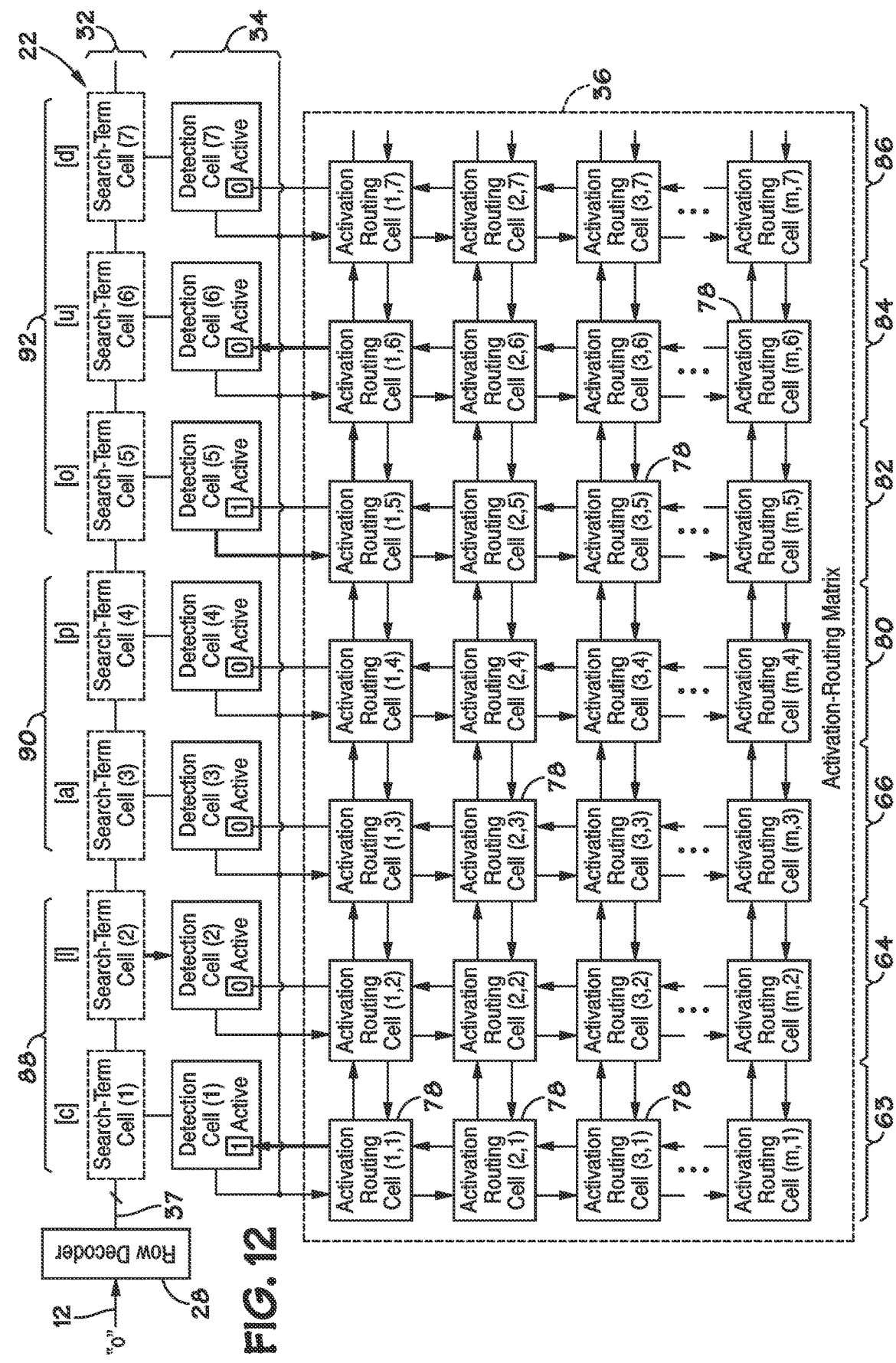

FIGS. 10-12 depict both an example of a more complex search criterion and features of the activation-routing matrix 36. The activation-routing matrix 36 may include a plurality of activation-routing cells 78, groups of which may be associated with each of the feature cells 63, 64, 66, 80, 82, 84, and 86. For instance, each of the feature cells may include 5, 10, 20, 50, or more activation-routing cells 78. The activation-routing cells 78 may be configured to transmit activation signals to the next search term in a search criterion when a preceding search term is matched. The activation-routing cells 78 may be configured to route activation signals to adjacent feature cells or other activation-routing cells 78 within the same feature cell. The activation-routing cells 78 may include memory that indicates which feature cells correspond to the next search term in a search criterion.

As illustrated by FIGS. 10-12, the recognition module 22 may be configured to search according to complex search criteria than criteria that specify single words. For instance, the recognition module 22 may be configured to search for words beginning with a prefix 88 and ending with one of two suffixes 90 or 92. The illustrated search criterion specifies words beginning with the letters "c" and "1" in sequence and ending with either the sequence of letters "ap" or the sequence of letters "oud". This is an example of a search criterion specifying multiple target expressions, e.g., the word "clap" or the word "cloud".

In FIG. 10, the data stream 12 presents the letter "c" to the recognition module 22, and feature cell 63 is both active and detects a match. In response, the activation-routing matrix 36 may activate the next feature cell 64. The activation-routing matrix 36 may also maintain the active state of the feature cell 63, as the feature cell 63 is the first search term in the search criterion.

In FIG. 11, the data stream 12 presents a letter "1", and the feature cell 64 recognizes a match and is active. In response, the activation-routing matrix 36 may transmit an activation signal both to the first feature cell 66 of the first suffix 90 and to the first feature cell 82 of the second suffix 92. In other examples, more suffixes may be activated, or multiple prefixes may active one or more suffixes.

Next, as illustrated by FIG. 12, the data stream 12 presents the letter "o" to the recognition module 22, and the feature cell 82 of the second suffix 92 detects a match and is active.

In response, the activation-routing matrix 36 may activate the next feature cell 84 of the second suffix 92. The search for the first suffix 90 may die out, as the feature cell 66 is allowed to go inactive. The steps illustrated by FIGS. 10-12 may continue through the letters "u" and "d", or the search may die out until the next time the prefix 88 is matched.

FIG. 13 illustrates an embodiment of a system 94 having a pattern-recognition bus 96 and a memory bus 98. The pattern-recognition bus 96 and the memory bus 98 may be similar or identical to each other. Using similar buses may allow designers to leverage their knowledge of the memory bus 98 when implementing the pattern-recognition bus 96, thereby facilitating implementation of the pattern-recognition processor 14 in the system 94. If identical buses are used for the memory bus 98 and the pattern-recognition bus 96, these two devices may be present on a single bus, preventing the need for additional signals in the system 94. Before describing the pattern-recognition bus 96 in detail, other aspects of the system 94 are described.

The system 94 may include the CPU 20, memory 100, a memory bus controller 102, and a pattern-recognition bus controller 104. The memory bus controller 102 may be connected to the memory 100 by the memory bus 98 and to the CPU 20 by both an address and control bus 106 and a data bus 108. The pattern-recognition bus controller 104 may be connected to the pattern-recognition processor 14 by the pattern-recognition bus 96 and to the CPU 20 by an address and control bus 110 and a data bus 112. The pattern-recognition bus controller 104 may be a separate component, e.g., a chip, coupled to the CPU 20, or it may be integrated into the same component as the CPU 20, e.g., as a single chip or multi-chip module. Similarly, the memory bus controller 102 may be a separate component, or it may be integrated into the same component as the CPU 20. The pattern-recognition bus controller 104 and the memory bus controller 102 may be both integrally formed into the same component, or they may be separate components. Some embodiments may not include the memory 100 or the memory bus controller 102, which is not to suggest that any other feature described herein may not also be omitted.

The memory 100 may include a variety of different types of memory, such as dynamic random access memory (DRAM) or various types of nonvolatile memory, e.g., flash, phase-change memory, or a hard disk drive. The memory bus controller 102 may be configured to communicate with the memory 100 through one of a variety of different communication protocols, such as any of the bus revisions of Double Data rate Synchronous Dram (the double data rate (DDR) protocol, the DDR2 protocol, the DDR3 protocol, the DDR4 protocol), Synchronous DRAM (SDRAM) protocol, Serial Gigabit Media Independent Interface (SGMII) protocol, Inter-Integrated Circuit (I2C) protocol, Serial Peripheral Interface (SPI) protocol, Parallel Bus Interface (PBI) protocol, Secure Digital Interface (SDI) protocol, Personal Computer Memory Card Association (PCMCIA) protocol, Management Data Clock/Management Data Input/Output (MDC/MDIO) protocol, Peripheral Component Interconnect (PCI) protocol, PCI Express protocol or other communication protocols. Although implementation using DDR protocols shall be described in detail herein, any or all of the communication protocols provide the ability to accomplish the necessary communications to communicate address, control, data and status information. As referred to herein, data may include, but is not limited to: 1) information which is stored in the pattern-recognition processor which defines all aspects of the sought-after pattern recognition functions; 2) conventional data such as that which is stored in memory devices; and 3) the data stream which is sent to the pattern-recognition processor from which pattern-match results are sought. In some communications protocols, there is only a physical data bus, therefore address, control, data and status information are provided in the slots provisioned within the communications protocol.

The pattern-recognition bus controller 104 may be configured to communicate with the pattern-recognition processor 14 through a communication protocol that is similar or identical to that used by the memory bus controller 102. For example, the pattern-recognition bus 96 may include about the same number or exactly the same number of connections as the memory bus 98. The pattern-recognition bus controller 96 may use a communication protocol with similar or identical timing to the memory bus controller 102. For instance, the pattern-recognition bus controller 104 may operate in response to the same clock signal as the memory bus controller 102, or the pattern-recognition bus controller 104 may transmit and receive data during the same portions of a clock signal as the memory bus controller 102, e.g., during the rising and falling edge of the clock signal. The physical dimensions of the pattern-recognition bus 96 may be generally similar or identical to those of the memory bus 98. For example, the spacing between pin connectors or connection pads that connect to the pattern-recognition processor 14 and the memory 100 may be generally similar or identical.

Additionally, having the memory 100 and the pattern-recognition processor 14 on the same bus may provide the advantages, such as: eliminating the delays inherent in passing data from one bus to another, e.g., in a computer system having DDR3 main memory 100 and a pattern-recognition processor 14 on a PCIx bus there may be significant delay communicating between the pattern recognition processor 14 and main memory 100; Direct Memory Access (DMA) is faster and easier to implement on the same bus and may be performed by a single common pattern-recognition processor 14 and/or memory controller; Radio Frequency Interference (RFI) issues are simplified with a single bus; Electro-Static Discharge (ESD) issues are simplified and will be smaller; Printed-Circuit Assembly (PCA) is less expensive to produce with a single bus (e.g., smaller PCB size, elimination of an extra controller and passive components of the extra bus, reduced component insertion time, reduced power supply size, increased quality, etc.); and reduced power usage (e.g., due to the elimination of additional clocking and synchronization circuitry).

Figure 14:
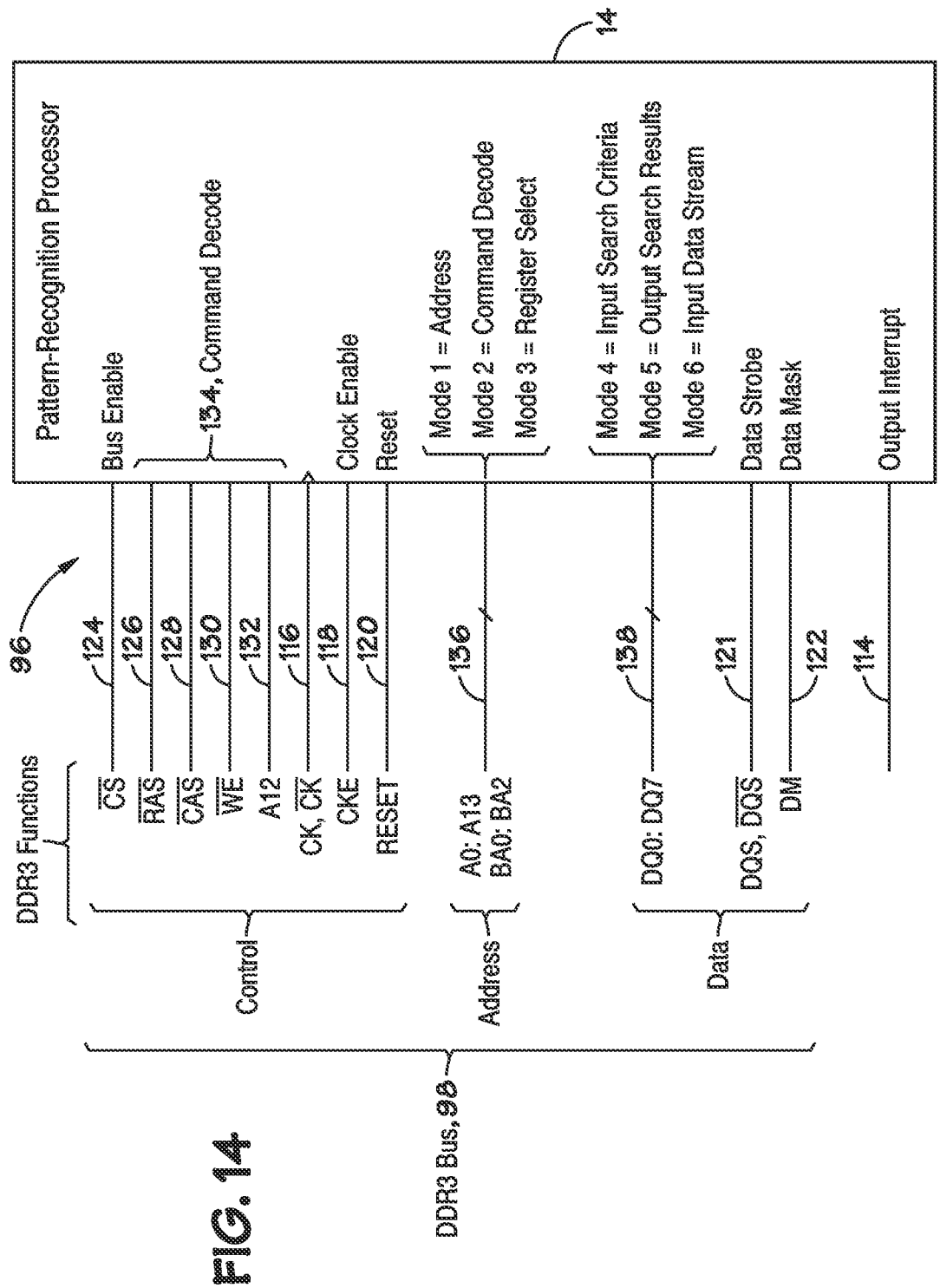
FIG. 14 illustrates an embodiment of the pattern-recognition bus of FIG. 13 in accordance with an embodiment of the present technique.

FIG. 14 illustrates both an embodiment of the pattern-recognition bus 96 and how the embodiment may relate to an embodiment of the memory bus 98. In this example, the memory bus 98 may be a DDR3 bus, and the pattern-recognition bus 96 may share certain features with the memory bus 98. The illustrated memory bus 96 includes the same number of connections as the memory bus 98 with the addition of an output interrupt signal 114 that is described further below. Other embodiments may include the same number of connections as the memory bus 98, a different number of connections as the memory bus 98, the same number of connections within plus or minus 1, 2, 4, 6, or 8 connections, or operate with different wire speeds and protocols, but the functions remain the same. Addresses, control signals, data and status information are mapped into the existing bus protocol of any chosen style of bus. Further, such embodiments of the pattern-recognition bus 96 may include a close derivative of a standard memory bus, e.g., if the memory bus 98 is a DDR3 bus), that eliminates signals not used by the pattern-recognition processor 14. such may embodiments may also a pattern-recognition bus 96 that is a "super-set" of a standard memory bus, such that the pattern-recognition bus 96 includes all signals of a standard memory bus and adds signals used by the pattern-recognition processor 14. Other embodiments may include any combination of signals of the close derivative of a standard memory bus and the "super-set" of a standard memory bus.

Some of the signals on the pattern-recognition bus 96 may connect to the same pin and serve the same function as the corresponding signals in the memory bus 98. For example, the clock signal 116, the clock enable signal 118, the reset signal 120, the data strobe signal 121, and the data mask signal 122 may have the same function on both buses 96 and 98 and the same position relative to the other portions of the buses 96 and 98. Other embodiments may include additional similar signals or fewer similar signals. For example, some older bus protocols may not support the reset signal, but any such function can be added as an extension to an existing protocol.

Some of the signals on the pattern-recognition bus 96 may be reinterpreted from their function on the memory bus 98. For example, the column select signal 124 may be interpreted as a bus enable signal by the pattern-recognition processor 14. The row address strobe signal 126, the column address strobe signal 128, the write enable signal 130, and the burst chop signal 132 may be interpreted by the pattern-recognition processor 14 as command decode signals 134 on the pattern-recognition bus 96.

Some of the signals on the pattern-recognition bus 96 may serve either the same function as on the memory bus 98 or different functions depending on a mode of operation of the pattern-recognition processor 14. For example, the address signals and block address signals 136 may convey address data when the pattern-recognition processor 14 is in a first mode of operation, command decode signals when the pattern-recognition processor 14 is in a second mode of operation, and register select signals when the pattern-recognition processor 14 is in a third mode of operation.

In another example, the data signals 138 on the pattern-recognition bus 96 may be interpreted differently in different modes of operation. The data signals 138 may be interpreted as input search criteria by the pattern-recognition processor 14 when in a fourth mode of operation, e.g., a configuration mode. The search criteria may include settings for the feature cells 30 (FIG. 2), such as the values stored in the memory cells 58 (FIG. 3), the values stored in the memory cells 70 (FIG. 6), and the settings for the activation-routing matrix (FIG. 10). The search criteria may also include settings for the aggregation routing matrix 42 (FIG. 2), the threshold logic matrix 44, the logical product matrix 46, the logical sum matrix 48, and the initialization routing matrix 50. The pattern-recognition processor 14 may also have a fifth mode of operation, e.g., a search-report mode, in which it may output search results through the data signals 138. In a sixth mode of operation, e.g., a search mode, the pattern-recognition processor 14 may interpret the data signals 138 as the input data stream 12 (FIG. 2).

The output interrupt signal 114 may be selected by the pattern-recognition processor 14 in response to the data stream 12 (FIG. 1) satisfying a search criterion. The CPU 20 (FIG. 13) may respond to the output interrupt signal 114 being selected by directing the pattern-recognition processor 14 to enter the search-report mode. Once in this mode, the pattern-recognition processor 14 may output search results through the data signals 138. Search results may include data that indicates which search criterion was satisfied and which data from the data stream satisfied the criterion. After the search results are received by the CPU 20, the CPU 20 may direct the pattern-recognition processor 14 to re-enter the search mode, and the CPU 20 may transmit the data stream 12 (FIG. 1) to the pattern-recognition processor 14 through the data signals 138.

Other embodiments may not include the output interrupt signal 114. The CPU 20 may determine whether the pattern-recognition processor 14 has detected a match by periodically polling the pattern-recognition processor 14 to determine whether the pattern-recognition processor 14 has detected a satisfied criterion. For example, data indicating a match may be stored in a register in the pattern-recognition processor 14, and the CPU 20 may read the values stored by that register to determine whether a match has been detected.

FIG. 15 illustrates an embodiment of a process 140 that transmits multiple types of signals through a single portion of a bus. Examples of signal types include control signals, address signals, input data signals, output data signals, search criteria signals, and clock signals. The process 140 may begin with transmitting a first type of signal on a portion of a pattern-recognition bus to a pattern-recognition processor, as illustrated by block 142. In some embodiments, the first type of signal may be address signal, command decode signals, register select signals, input search criteria signals, output search criteria signals, or an input data stream.

Next, a mode of the pattern-recognition processor may be changed, as illustrated by block 144. The mode may be changed by a signal sent by some other component, such as the CPU 20 (FIG. 13), or by the pattern-recognition processor 14 (FIG. 13) in response to satisfaction of a criterion or other event. The mode of the pattern-recognition processor 14 may be changed by changing a value stored in a register in the pattern-recognition processor.

Next, a second type of signal may be transmitted on the portion of the pattern-recognition bus, as illustrated by block 146. Transmitting the second type of signal may include transmitting one of the types of signal described above that is different from the first type of signal. The direction of transmission may be the same as that of the transmission described by block 142, or the direction may be different. For example, an input data stream may be transmitted to the pattern-recognition processor 14 (FIG. 14) during the transmission described by block 142, and output search results may be transmitted from the pattern-recognition processor 14 on the same portion of the bus, e.g., the data signals 138.

Transmitting different signal types on the same bus portion during different modes of operation is believed to reduce the number of signal paths on the pattern-recognition bus 96 relative to buses that have separate signal paths for each signal type. Sharing signal paths is believed to allow the pattern-recognition bus 96 to be made more similar to the memory bus 98 described above, which is believed to simplify implementation of pattern-recognition processors.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A system, comprising:
   a pattern-recognition processor comprising a plurality of memory elements and a detection cell coupled to the plurality of memory elements that when in operation search a data stream received by the pattern-recognition processor according to a search criterion, wherein the pattern-recognition processor is configured to receive a first signal over a bus, wherein the pattern-recognition processor is configured to process the first signal to perform a first function at the pattern-recognition processor identically to a memory processing the first signal when received over the bus to perform the first function at the memory, wherein the pattern-recognition processor comprises an output, wherein the pattern-recognition processor is configured to transmit an output interrupt signal from the output in response to an analysis of the data stream by the pattern-recognition processor satisfying the search criterion by advancing to a last search term of the search criterion and matching it.

2. The system of claim 1, wherein the pattern-recognition processor is configured to receive a second signal over the bus, wherein the pattern-recognition processor is configured to process the second signal to perform a second function at the pattern-recognition processor differently from the memory processing the second signal when received over the bus to perform a third function at the memory.

3. The system of claim 1, wherein the pattern-recognition processor is configured to receive a second signal over the bus, wherein the pattern-recognition processor is configured to process the second signal to perform a second function at the pattern-recognition processor identically to the memory processing the second signal when received over the bus to perform the second function at the memory when the pattern-recognition processor operates in a first mode.

4. The system of claim 3, wherein the pattern-recognition processor is configured to receive the second signal over the bus, wherein the pattern-recognition processor is configured to process the second signal to perform the second function at the pattern-recognition processor differently from the memory processing the second signal when received over the bus to perform a third function at the memory when the pattern-recognition processor operates in a second mode.

5. The system of claim 1, comprising a CPU coupled to the pattern-recognition processor via the bus.

6. The system of claim 5, wherein the pattern-recognition processor and the CPU are separate components.

7. The system of claim 5, wherein the pattern-recognition processor and the CPU are integrated as a single component.

8. The system of claim 5, wherein the CPU is configured to respond to the output interrupt signal by directing the pattern-recognition processor to enter a search-report mode.

9. The system of claim 1, comprising a pattern-recognition bus controller coupled to a CPU via a control bus and a data bus and coupled to the pattern-recognition processor via the bus.

10. The system of claim 9, comprising a memory bus controller coupled to the memory via the bus.

11. The system of claim 10, wherein the memory bus controller and the pattern-recognition bus controller are separate components.

12. The system of claim 10, wherein the memory bus controller and the pattern-recognition bus controller are integrated as a single component.

13. The system of claim 10, wherein the pattern-recognition bus controller is configured to communicate with the pattern-recognition processor through a communication protocol that is at least similar to that used by the memory bus controller.

14. A system, comprising:
a pattern-recognition processor comprising an integrated circuit having a first input pin as an address pin configured to receive a first signal over a bus and a second input pin as a data pin configured to receive a data stream to be searched by the pattern-recognition processor, wherein the pattern-recognition processor is configured to process the first signal as a first type of pattern-recognition processor configuration signal when the pattern-recognition processor is in a first mode of operation, wherein the pattern-recognition processor is configured to process the first signal as a second type of pattern-recognition processor configuration signal when the pattern-recognition processor is in a second mode of operation, wherein the pattern-recognition processor is configured to process the first signal as a third type of pattern-recognition processor configuration signal when the pattern-recognition processor is in a third mode of operation, wherein the pattern-recognition processor is configured to receive the first signal at the address pin separate from a receipt of the data stream to be searched by the pattern-recognition processor at the data pin.

15. The system of claim 14, wherein the pattern-recognition processor is configured to perform a search of the data stream.

16. The system of claim 15, wherein the pattern-recognition processor is configured to transmit a search result as a result of the search of the data stream.

17. The system of claim 14, wherein the pattern-recognition processor is configured to receive a second signal over the bus, wherein the pattern-recognition processor is configured to access a register in response to receipt of the second signal.

18. The system of claim 14, comprising a CPU coupled to the pattern-recognition processor, wherein the pattern-recognition processor is configured to transmit a second signal over the bus to indicate satisfaction of a search criterion by the pattern-recognition processor.

19. A system, comprising:
a pattern-recognition processor comprising a plurality of memory elements and a detection cell coupled to the plurality of memory elements that when in operation search a data stream received by the pattern-recognition processor according to a search criterion, wherein the pattern-recognition processor is configured to receive a signal over a bus, wherein the pattern-recognition processor is configured to process the signal to perform a first function at the pattern-recognition processor identically to a memory processing the signal when received over the bus to perform the first function at the memory when the pattern-recognition processor operates in a first mode, wherein the pattern-recognition processor is configured to process the signal to perform a second function at the pattern-recognition processor differently from the memory processing the signal when received over the bus to perform a third function at the memory when the pattern-recognition processor operates in a second mode, wherein the pattern-recognition processor comprises a register, wherein the pattern-recognition processor is configured to periodically receive a request to determine whether the pattern-recognition processor has detected a match as a satisfied criterion by advancing to a last search term of the search criterion and matching it when analyzing the data stream, wherein the pattern-recognition processor is configured to store an indication of the match in the register.

20. The system of claim 19, wherein the bus comprises a same number of connections as a memory bus.

* * * * *